United States Patent
Yu et al.

(10) Patent No.: US 10,966,085 B2
(45) Date of Patent: Mar. 30, 2021

(54) METHODS FOR AUTONOMOUS AUTHENTICATION FOR VEHICLE-TO-VEHICLE (V2V) COMMUNICATIONS IN OUT-OF-COVERAGE SCENARIOS

(71) Applicant: Intel Corporation, Santa Clara, CA (US)

(72) Inventors: Zhibin Yu, Unterhaching (DE); Biljana Badic, Munich (DE); Markus Dominik Mueck, Unterhaching (DE)

(73) Assignee: INTEL CORPORATION, Santa Clara, CA (US)

( * ) Notice: Subject to any disclaimer, the term of this patent is extended or adjusted under 35 U.S.C. 154(b) by 194 days.

(21) Appl. No.: 16/145,212

(22) Filed: Sep. 28, 2018

(65) Prior Publication Data
US 2019/0053051 A1    Feb. 14, 2019

(51) Int. Cl.
*H04W 12/06* (2009.01)
*H04W 76/14* (2018.01)
(Continued)

(52) U.S. Cl.
CPC ........... *H04W 12/06* (2013.01); *H04L 1/1861* (2013.01); *H04L 9/0825* (2013.01);
(Continued)

(58) Field of Classification Search
CPC ..... H04W 12/06; H04W 84/18; H04W 60/04; H04W 8/26; H04W 76/14; H04W 4/40; H04W 76/11; H04W 4/46; H04W 8/24; H04L 2209/80; H04L 61/6054; H04L 9/0891; H04L 9/3226; H04L 61/00; H04L 63/0876; H04L 1/1861; H04L 9/0825; H04L 2209/84
See application file for complete search history.

(56) References Cited

U.S. PATENT DOCUMENTS

| 2005/0237942 A1* | 10/2005 | Lewis ................... H04W 24/10 370/241 |
| 2011/0307694 A1* | 12/2011 | Broustis .................. H04W 4/70 713/163 |

(Continued)

OTHER PUBLICATIONS

Techopedia, "International Mobile Subscriber Identity (IMSI)", https://www.techopedia.com/definition/5067/international-mobile-subscriber-identity-imsi, retrieved on Sep. 27, 2018, 1page.

(Continued)

*Primary Examiner* — Walter J Divito
(74) *Attorney, Agent, or Firm* — Viering, Jentschura & Partner MBB

(57) ABSTRACT

A terminal device includes a transmitter configured to transmit terminal identification information for identifying the terminal device to a base station of a radio communication network; a receiver configured to receive an acknowledgment from the base station in response to the terminal identification information, and to receive an authentication request for authenticating a further terminal device for peer-to-peer communications from the further terminal device; the transmitter being configured to transmit an acknowledgement to the further terminal device for authenticating the further terminal device for the peer-to-peer communications.

19 Claims, 18 Drawing Sheets

(51) Int. Cl.

| | |
|---|---|
| H04L 29/06 | (2006.01) |
| H04L 1/18 | (2006.01) |
| H04W 4/40 | (2018.01) |
| H04L 9/08 | (2006.01) |
| H04W 76/11 | (2018.01) |
| H04L 9/32 | (2006.01) |
| H04L 29/12 | (2006.01) |
| H04W 8/26 | (2009.01) |
| H04W 60/04 | (2009.01) |
| H04W 4/46 | (2018.01) |
| H04W 8/24 | (2009.01) |
| H04W 84/18 | (2009.01) |

(52) U.S. Cl.
CPC .......... *H04L 9/0891* (2013.01); *H04L 9/3226* (2013.01); *H04L 61/00* (2013.01); *H04L 63/0876* (2013.01); *H04W 4/40* (2018.02); *H04W 8/26* (2013.01); *H04W 76/11* (2018.02); *H04W 76/14* (2018.02); *H04L 2209/80* (2013.01); *H04L 2209/84* (2013.01); *H04W 4/46* (2018.02); *H04W 8/24* (2013.01); *H04W 60/04* (2013.01); *H04W 84/18* (2013.01)

(56) References Cited

U.S. PATENT DOCUMENTS

| | | | |
|---|---|---|---|
| 2014/0068023 A1* | 3/2014 | Arickan | H04L 61/2015 709/220 |
| 2014/0126410 A1* | 5/2014 | Agarwal | H04W 36/32 370/252 |
| 2017/0039848 A1* | 2/2017 | Hakeem | G08B 25/016 |
| 2018/0262388 A1* | 9/2018 | Johnson | H04L 41/28 |
| 2019/0260575 A1* | 8/2019 | Nenov | H04L 9/0894 |
| 2020/0092794 A1* | 3/2020 | Kang | H04W 48/02 |

OTHER PUBLICATIONS

Share Technote, "LTE Quick Reference—Authentication", http://www.sharetechnote.com/htmlHandbook_LTE_Authentication.html, retrieved on Sep. 27, 2018, 6 pages.

3GLTEinfo "LTE Security Architecture", http://www.3glteinfo.com/lte-security-architecture/, retrieved on Sep. 27, 2018, 20 pages.

3GPP, Technical Specification Group Services and System Aspects; General Packet Radio Service (GPRS); Service description; Stage 2, 3rd Generation Partnership Project (GPP), TS 23.060, Jun. 2018, 367 pages, V15.3.0.

3GPP, Technical Specification Group Services and System Aspects; General Packet Radio Service (GPRS) enhancements for Evolved Universal Terrestrial Radio Access Network (E-UTRAN) access, 3rd Generation Partnership Project, TS 23.401, Jun. 2018, 410 pages, V15.4.0.

3G4G, "Simplified Call Flow Signaling: Registration:—The Attach Procedure", Sep. 2017, 18 pages.

* cited by examiner

METHODS FOR AUTONOMOUS AUTHENTICATION FOR VEHICLE-TO-VEHICLE (V2V) COMMUNICATIONS IN OUT-OF-COVERAGE SCENARIOS

TECHNICAL FIELD

Various aspects of this disclosure generally relate to methods and devices for authenticating for example vehicular communication devices traveling outside of coverage of a centralized radio network for example for LTE V2V sidelink communications.

BACKGROUND

Vehicle to vehicle (V2V) communication systems may enable vehicles to set up direct communication links (peer-to-peer links) for exchange of data such as safety data. Hereby, security of communication links may be an important aspect as communication links corrupted by non-authenticated terminal devices may disable safety mechanisms built upon V2V communications which may result in damage and severe danger for human life. V2V communication links may be controlled via a centralized infrastructure (e.g. via base stations and/or Road Side Units (RSUs) further connected to a core-network through backhauls). Since such centralized infrastructure can usually be trust, it can be used for provision of security applications ensuring security of V2V communication links. An example security application may include authentication of terminal devices based on asymmetrical encryption algorithms.

While authentication of a terminal device by a centralized radio network may be suitable for providing reliable authentication and security, such authentication scheme may not be applicable to terminal devices traveling outside of coverage of corresponding base stations. However, terminal devices such as for example V2V terminal devices may be configured to nevertheless establish links for direct communications, even though the terminal devices are not within coverage of the network. In view of this, various aspects of the present disclosure provide schemes for authenticating terminal devices that are not within coverage of base stations of a centralized radio communication network.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the present disclosure are described with reference to the following drawings, in which.

DESCRIPTION

Figure 1:
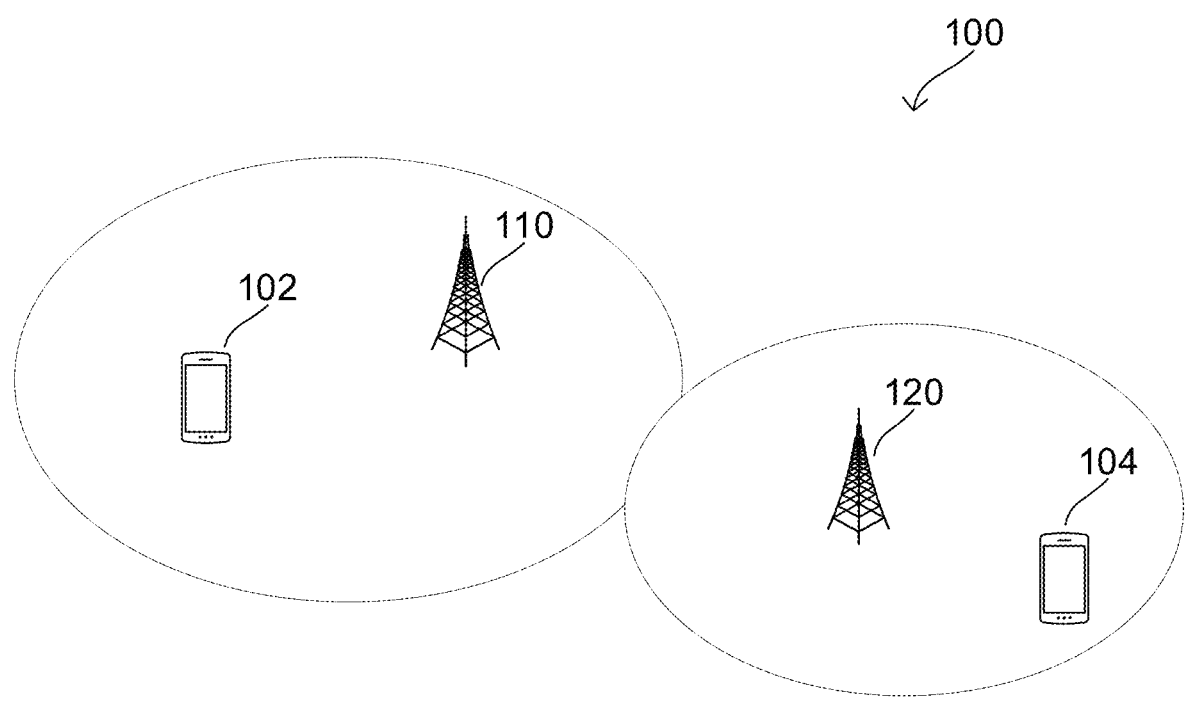
FIG. 1 shows an exemplary embodiment of a network architecture of a radio access network according to some aspects.

The following detailed description refers to the accompanying drawings that show, by way of illustration, specific details and aspects of embodiments in which the invention may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "lesser subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" or "wireless device" utilized herein refers to user-side devices (both portable and fixed) that can connect to a core network and/or external data networks via a radio access network. "Terminal device" or "wireless device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices or wireless devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal or wireless devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Any of the radio links described herein may in various aspects operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (allocated for example in the USA (FCC Part 15)), 863-868.6 MHz (allocated for example in the European Union (ETSI EN 300 220)), 915.9-929.7 MHz (allocated for example in Japan), 917-923.5 MHz (allocated for example in South Korea), 755-779 MHz and 779-787 MHz (allocated for example in China), 790-960 MHz, 1710-2025 MHz, 2110-2200 MHz, 2300-2400 MHz, 2.4-2.4835 GHz (this is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (allocated for example in the USA for Citizen Broadband Radio Service), 5.15-5.25 GHz and 5.25-5.35 GHz and 5.47-5.725 GHz and 5.725-5.85 GHz bands (allocated for example in the USA (FCC part 15), consists four U-NII bands in total 500 MHz spectrum), 5.725-5.875 GHz (allocated for example in EU (ETSI EN 301 893)), 5.47-5.65 GHz (allocated for example in South Korea, 5925-7125 MHz and 5925-6425 MHz band (under consideration in the USA and the EU, respectively). Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (this band has near-global designation for Multi-Gigabit Wireless Systems (MGWS)/WiGig. In the USA (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document may be defined for the network side, such as Access Points, eNodeBs, New Radio (NR) or next generation Node Bs (gNodeB or gNB—note that this term is typically used in the context of 3GPP fifth generation (5G) communication systems), etc. Still, in certain aspects, a User Equipment (UE), terminal or wireless device may take this role as well and act as an Access Point, eNodeB, gNodeB, etc. In other words, some or all features defined for network equipment may be implemented by a UE, a terminal or wireless device.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Figure 2:
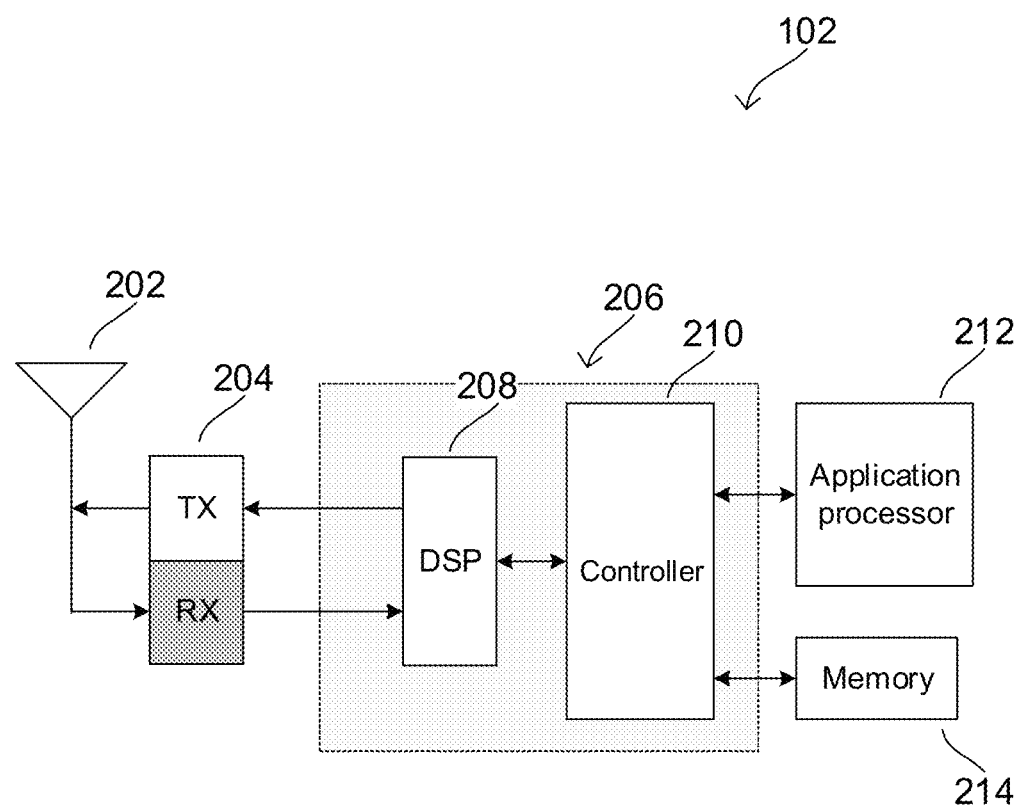
FIG. 2 shows an exemplary internal configuration of a terminal device according to some aspects.

FIGS. 1 and 2 depict an exemplary network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., gNBs, eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of terminal device 102 according to some aspects, which may include antenna system 202, radio frequency (RF) transceiver 204, baseband modem 206 (including digital signal processor 208 and controller 210), application processor 212, and memory 214. Although not explicitly shown in FIG. 2, in some aspects terminal device 102 may include one or more additional hardware and/or software components, such as processors/ microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by controller 210 for transmission via RF transceiver 204, and, in the receive path, prepare incoming received data provided by RF transceiver 204 for processing by controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while controller 210 may be responsible for upper-layer protocol stack functions (e.g., Data Link Layer/Layer 2 and/or Network Layer/Layer 3). Controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol stack software. Controller 210 may include one or more processors configured to retrieve and execute program code that defines the upper-layer protocol stack logic for one or more radio communication technologies, which can include Data Link Layer/Layer 2 and Network Layer/Layer 3 functions. Controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 210 may include executable instructions that define the logic of such functions.

In some aspects, terminal device 102 may be configured to transmit and receive data according to multiple radio communication technologies. Accordingly, in some aspects one or more of antenna system 202, RF transceiver 204, digital signal processor 208, and controller 210 may include separate components or instances dedicated to different radio communication technologies and/or unified components that are shared between different radio communication technologies. For example, in some aspects controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and controller 210 are shown as individual components in FI, in some aspects antenna system 202, RF transceiver 204, digital signal processor 208, and/or controller 210 can encompass separate components dedicated to different radio communication technologies.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 3:
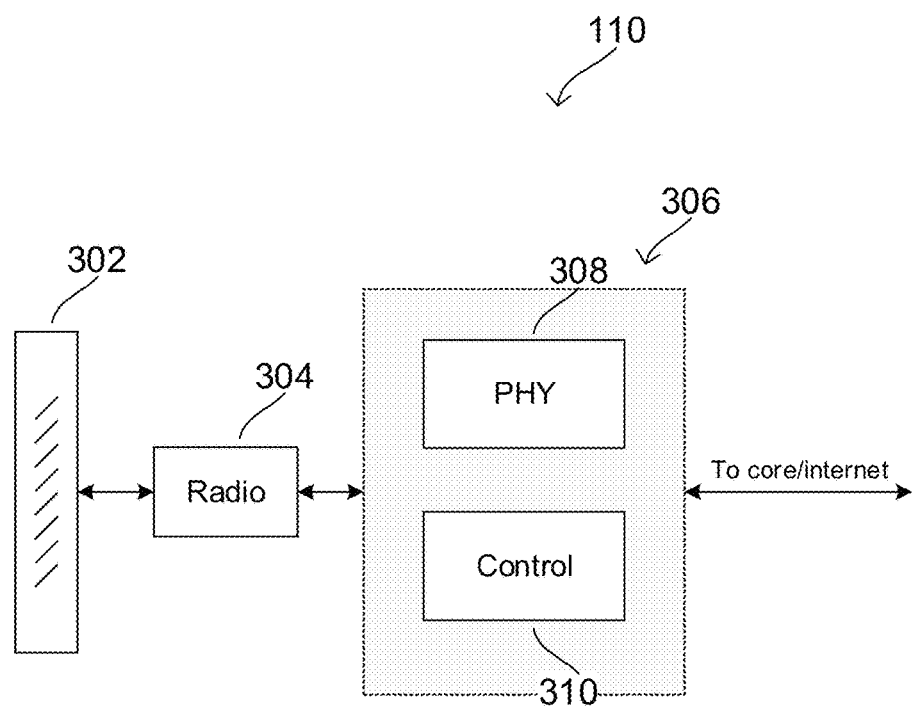
FIG. 3 shows an exemplary internal configuration of a network access node according to some aspects.

FIG. 3 shows an exemplary internal configuration of a network access node, such as network access node 110, according to some aspects. As shown in FIG. 3, network access node 110 may include antenna system 302, radio transceiver 304, and baseband subsystem 306 (including physical layer processor 308 and controller 310). In an abridged overview of the operation of network access node 110, network access node 110 may transmit and receive wireless signals via antenna system 302, which may be an antenna array including multiple antennas. Radio transceiver 304 may perform transmit and receive RF processing to convert outgoing baseband samples from baseband subsystem 306 into analog radio signals to provide to antenna system 302 for radio transmission and to convert incoming analog radio signals received from antenna system 302 into baseband samples to provide to baseband subsystem 306. Physical layer processor 308 may be configured to perform transmit and receive PHY processing on baseband samples received from radio transceiver 304 to provide to controller 310 and on baseband samples received from controller 310 to provide to radio transceiver 304. Controller 310 may control the communication functionality of network access node 110 according to the corresponding radio communication technology protocols, which may include exercising control over antenna system 302, radio transceiver 304, and physical layer processor 308. Each of radio transceiver 304, physical layer processor 308, and controller 310 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. In some aspects, radio transceiver 304 may be a radio transceiver including digital and analog radio frequency processing and amplification circuitry. In some aspects, radio transceiver 304 may be a software-defined radio (SDR) component implemented as a processor configured to execute software-defined instructions that specify radio frequency processing routines. In some aspects, physical layer processor 308 may include a processor and one or more hardware accelerators, wherein the processor is configured to control physical layer processing and offload certain processing tasks to the one or more hardware accelerators. In some aspects, controller 310 may be a controller configured to execute software-defined instructions that specify upper-layer control functions. In some aspects, controller 310 may be limited to radio communication protocol stack layer functions, while in other aspects controller 310 may also be configured for transport, internet, and application layer functions.

Network access node 110 may thus provide the functionality of network access nodes in radio communication networks by providing a radio access network to enable served terminal devices to access communication data. For example, network access node 110 may also interface with a core network, one or more other network access nodes, or various other data networks and servers via a wired or wireless backhaul interface.

Figure 4:
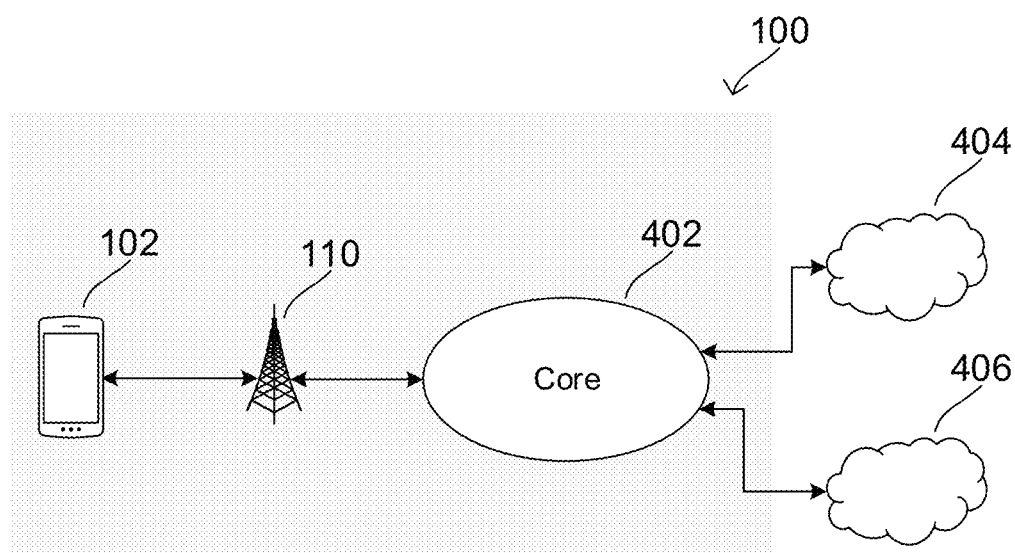
FIG. 4 shows an exemplary network architecture of a radio access network, core network, and external data networks according to some aspects.

As previously indicated, network access nodes 112 and 114 may interface with a core network. FIG. 4 shows an exemplary configuration in accordance with some aspects where network access node 110 interfaces with core network 402, which may be, for example, a cellular core network. Core network 402 may provide a variety of functions to manage operation of radio communication network 100, such as data routing, authenticating and managing users/subscribers, interfacing with external networks, and various other network control tasks. Core network 402 may therefore provide an infrastructure to route data between terminal device 104 and various external networks such as data network 404 and data network 406. Terminal device 104 may thus rely on the radio access network provided by network access node 110 to wirelessly transmit and receive data with network access node 110, which may then provide the data to core network 402 for further routing to external locations such as data networks 404 and 406 (which may be packet data networks (PDNs)). Terminal device 104 may therefore establish a data connection with data network 404 and/or data network 406 that relies on network access node 110 and core network 402 for data transfer and routing.

Figure 5:
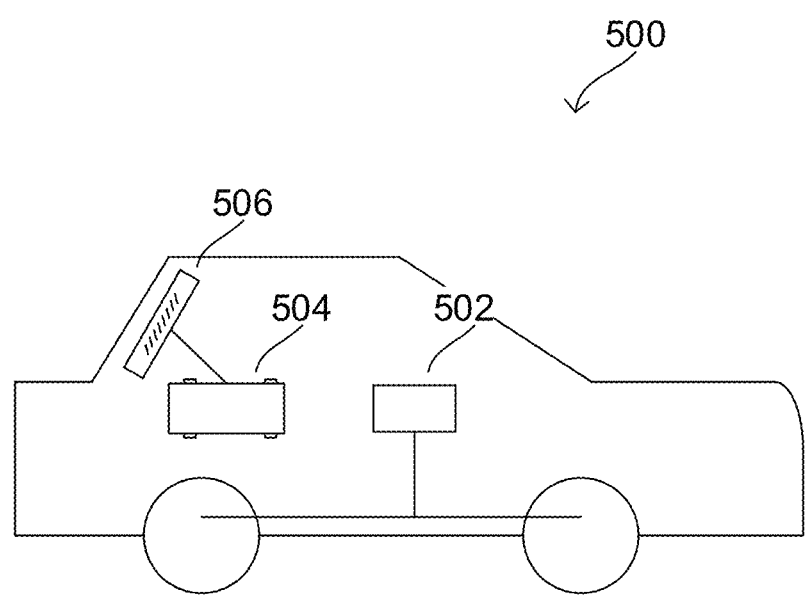
FIG. 5 shows an exemplary internal configuration of a vehicular communication device according to some aspects.

Terminal devices may in some cases be configured as vehicular communication devices. FIG. 5 shows an exemplary internal configuration of a vehicular communication device 500 according to some aspects. As shown in FIG. 5, vehicular communication device 500 may include steering and movement system 502, radio communication arrangement 504, and antenna system 506. The internal components of vehicular communication device 500 may be arranged around a vehicular housing of vehicular communication device 500, mounted on or outside of the vehicular housing, enclosed within the vehicular housing, or any other arrangement relative to the vehicular housing where the internal components move with vehicular communication device 500 as it travels. The vehicular housing, such as an automobile body, plane or helicopter fuselage, boat hull, or similar type of vehicular body dependent on the type of vehicle that vehicular communication device 500 is. Steering and movement system 502 may include components of vehicular communication device 500 related to steering and movement of vehicular communication device 500. In some aspects where vehicular communication device 500 is an automobile, steering and movement system 502 may include wheels and axles, an engine, a transmission, brakes, a steering wheel, associated electrical circuitry and wiring, and any other components used in the driving of an automobile. In some aspects where vehicular communication device 500 is an aerial vehicle, steering and movement system 502 may include one or more of rotors, propellers, jet engines, wings, rudders or wing flaps, air brakes, a yoke or cyclic, associated electrical circuitry and wiring, and any other components used in the flying of an aerial vehicle. In some aspects where vehicular communication device 500 is an aquatic or sub-aquatic vehicle, steering and movement system 502 may include any one or more of rudders, engines, propellers, a steering wheel, associated electrical circuitry and wiring, and any other components used in the steering or movement of an aquatic vehicle. In some aspects, steering and movement system 502 may also include autonomous driving functionality, and accordingly may also include a central processor configured to perform autonomous driving computations and decisions and an array of sensors for movement and obstacle sensing. The autonomous driving components of steering and movement system 502 may also interface with radio communication arrangement 504 to facilitate communication with other nearby vehicular communication devices and/or central networking components that perform decisions and computations for autonomous driving.

Radio communication arrangement 504 and antenna system 506 may perform the radio communication functionalities of vehicular communication device 500, which can include transmitting and receiving communications with a radio communication network and/or transmitting and receiving communications directly with other vehicular communication devices and terminal devices. For example, radio communication arrangement 504 and antenna system 506 may be configured to transmit and receive communications with one or more network access nodes, such as, in the exemplary context of DSRC and LTE V2V/V2X, Road Side Units (RSUs) and base stations.

Figure 6:
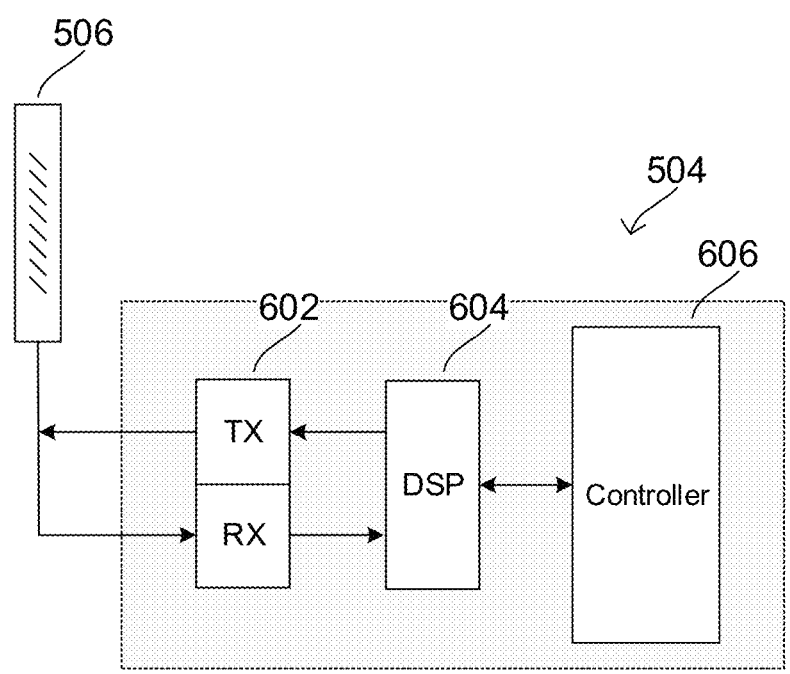
FIG. 6 shows an exemplary internal configuration of an antenna system and communication arrangement of a vehicular communication device according to some aspects.

FIG. 6 shows an exemplary internal configuration of antenna system 506 and radio communication arrangement 504 according to some aspects. As shown in FIG. 6, radio communication arrangement 504 may include RF transceiver 602, digital signal processor 604, and controller 606. Although not explicitly shown in FIG. 6, in some aspects radio communication arrangement 504 may include one or more additional hardware and/or software components (such as processors/microprocessors, controllers/microcontrollers, other specialty or generic hardware/processors/circuits, etc.), peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Controller 606 may be responsible for execution of upper-layer protocol stack functions, while digital signal processor 604 may be responsible for physical layer processing. RF transceiver 602 may be responsible for RF processing and amplification related to transmission and reception of wireless radio signals via antenna system 506.

Antenna system 506 may be a single antenna or an antenna array that includes multiple antennas. Antenna system 506 may additionally include analog antenna combination and/or beamforming circuitry. In the receive (RX) path, RF transceiver 602 may receive analog radio signals from antenna system 506 and perform analog and digital RF front-end processing on the analog radio signals to produce baseband samples (e.g., In-Phase/Quadrature (IQ) samples) to provide to digital signal processor 604. In some aspects, RF transceiver 602 can include analog and digital reception components such as amplifiers (e.g., a Low Noise Amplifiers (LNAs)), filters, RF demodulators (e.g., RF IQ demodulators)), and analog-to-digital converters (ADCs), which RF transceiver 602 may utilize to convert the received radio signals to baseband samples. In the transmit (TX) path, RF transceiver 602 may receive baseband samples from digital signal processor 604 and perform analog and digital RF front-end processing on the baseband samples to produce analog radio signals to provide to antenna system 506 for wireless transmission. In some aspects, RF transceiver 602 can include analog and digital transmission components such as amplifiers (e.g., Power Amplifiers (PAs), filters, RF modulators (e.g., RF IQ modulators), and digital-to-analog converters (DACs) to mix the baseband samples received from digital signal processor 604, which RF transceiver 602 may use to produce the analog radio signals for wireless transmission by antenna system 506.

Digital signal processor 604 may be configured to perform physical layer (PHY) transmission and reception processing to, in the transmit path, prepare outgoing transmit data provided by controller 606 for transmission via RF transceiver 602, and, in the receive path, prepare incoming received data provided by RF transceiver 602 for processing by controller 606. Digital signal processor 604 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 604 may include one or more processors configured to retrieve and execute program code that algorithmically defines control and processing logic for physical layer processing operations. In some aspects, digital signal processor 604 may execute processing functions with software via the execution of executable instructions. In some aspects, digital signal processor 604 may include one or more hardware accelerators, where the one or more processors of digital signal processor 604 may offload certain processing tasks to these hardware accelerators. In some aspects, the processor and hardware accelerator components of digital signal processor 604 may be realized as a coupled integrated circuit.

While digital signal processor 604 may be responsible for lower-layer physical processing functions, controller 606 may be responsible for upper-layer protocol stack functions. Controller 606 may include one or more processors configured to retrieve and execute program code that algorithmically defines the upper-layer protocol stack logic for one or more radio communication technologies, which can include Data Link Layer/Layer 2 and Network Layer/Layer 3 functions. Controller 606 may be configured to perform both user-plane and control-plane functions to facilitate the transfer of application layer data to and from radio communication arrangement 504 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 606 may include executable instructions that define the logic of such functions.

In some aspects, controller 606 may be coupled to an application processor, which may handle the layers above the protocol stack including transport and application layers. The application processor may act as a source for some outgoing data transmitted by radio communication arrangement 504 and a sink for some incoming data received by radio communication arrangement 504. In the transmit path, controller 606 may therefore receive and process outgoing data provided by the application processor according to the layer-specific functions of the protocol stack, and provide the resulting data to digital signal processor 604. Digital signal processor 604 may then perform physical layer processing on the received data to produce baseband samples, which digital signal processor may provide to RF transceiver 602. RF transceiver 602 may then process the baseband samples to convert the baseband samples to analog radio signals, which RF transceiver 602 may wirelessly transmit via antenna system 506. In the receive path, RF transceiver 602 may receive analog radio signals from antenna system 506 and process the analog RF signal to obtain baseband samples. RF transceiver 602 may provide the baseband samples to digital signal processor 604, which may perform physical layer processing on the baseband samples. Digital signal processor 604 may then provide the resulting data to controller 606, which may process the resulting data according to the layer-specific functions of the protocol stack and provide the resulting incoming data to the application processor.

In some aspects, radio communication arrangement 504 may be configured to transmit and receive data according to multiple radio communication technologies. Accordingly, in some aspects one or more of antenna system 506, RF transceiver 602, digital signal processor 604, and controller 606 may include separate components or instances dedicated to different radio communication technologies and/or unified components that are shared between different radio communication technologies. For example, in some aspects controller 606 may be configured to execute multiple protocol stacks, each dedicated to a different radio communication technology and either at the same processor or different processors. In some aspects, digital signal processor 604 may include separate processors and/or hardware accelerators that are dedicated to different respective radio communication technologies, and/or one or more processors and/or hardware accelerators that are shared between multiple radio communication technologies. In some aspects, RF transceiver 602 may include separate RF circuitry sections dedicated to different respective radio communication technologies, and/or RF circuitry sections shared between multiple radio communication technologies. In some aspects, antenna system 506 may include separate antennas dedicated to different respective radio communication technologies, and/or antennas shared between multiple radio communication technologies. Accordingly, while antenna system 506, RF transceiver 602, digital signal processor 604, and controller 606 are shown as individual components in FIG. 6, in some aspects antenna system 506, RF transceiver 602, digital signal processor 604, and/or controller 606 can encompass separate components dedicated to different radio communication technologies.

Figure 7:
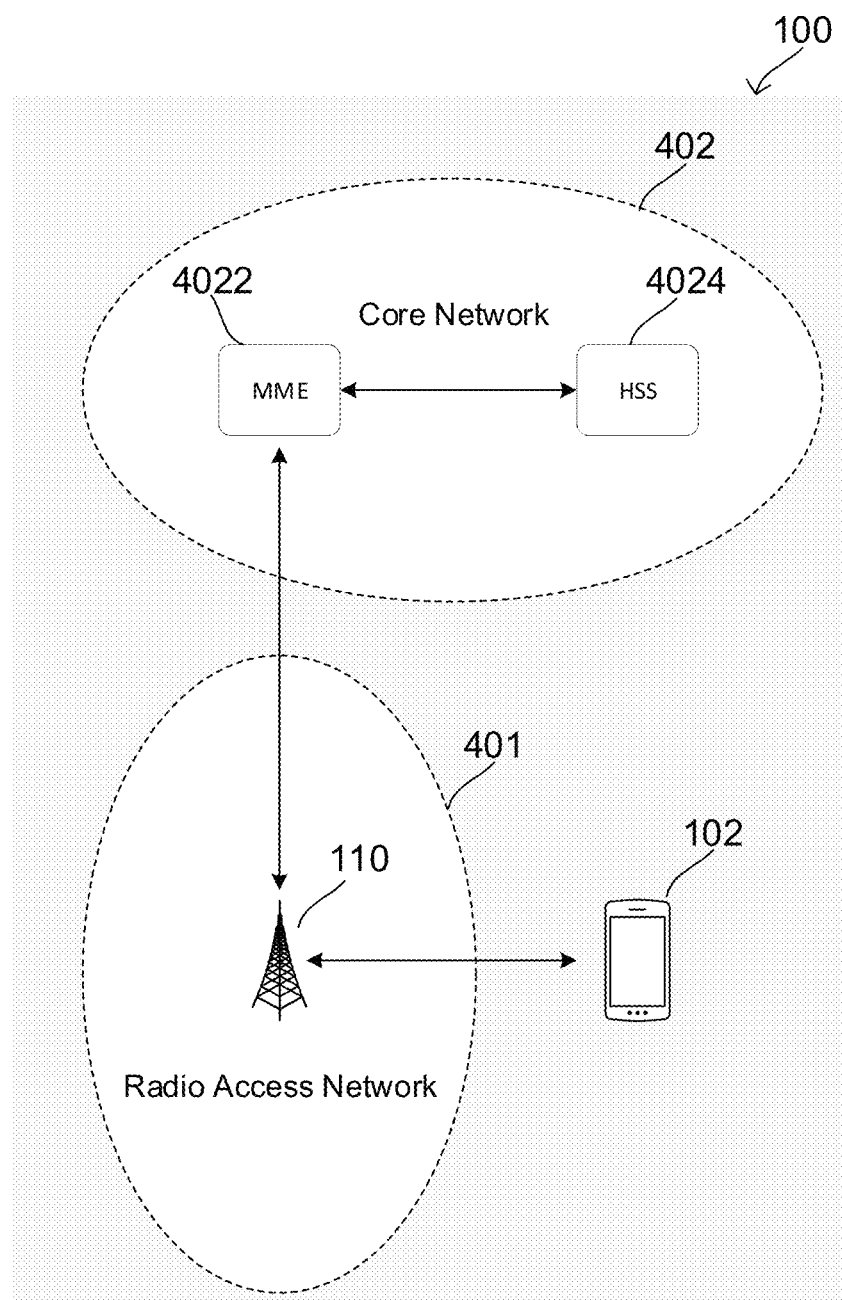
FIG. 7 shows an exemplary radio communication network where a core network includes exemplary 3GPP Long Term Evolution (LTE) core network nodes Mobile Management Entity (MME) and Home Subscriber Server (HSS) according to some aspects.
Figure 8:
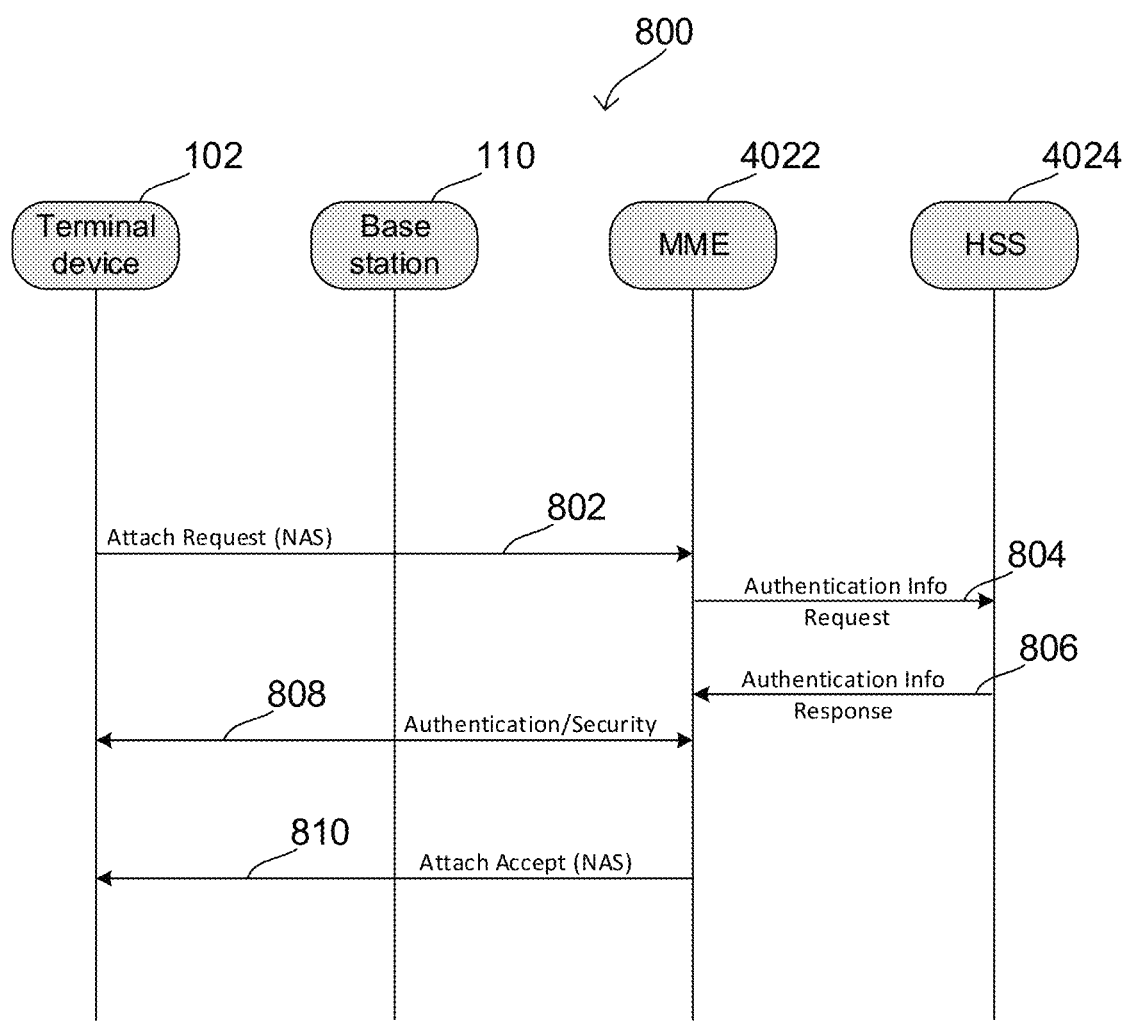
FIG. 8 exemplarily illustrates a simplified LTE attach procedure according to some aspects.

FIG. 7 shows an example of radio communication network 100 where core network 402 includes exemplary 3GPP Long Term Evolution (LTE) core network nodes Mobile Management Entity (MME) 4022 and Home Subscriber Server (HSS) 4024. In the exemplary illustrative setup of FIG. 7, the MME 4022 may be responsible for authenticating the terminal device 102, while the HSS 4024 may store corresponding subscriber information in a respective database. For example, when initially accessing a radio communication network (e.g. after being powered on), a terminal device may need to be registered and/or authenticated by the radio communication network. Thereby, in accordance with various aspects, authentication may be part of an initial attach procedure performed by terminal device 102 to be registered in a network. FIG. 8 exemplarily illustrates a simplified LTE attach procedure 800 in accordance with certain aspects. While the illustrated attach procedure 800 may be simplified to focus on authentication aspects, attach procedures in accordance with aspects of the present disclosure may include further stages or may omit certain illustrated stages.

As illustrated in FIG. 8, terminal device 102 may transmit a Non Access Stratum (NAS) attach request at stage 802 to network access node 110, which in the exemplary LTE case may be a 4G Evolved NodeB (eNB) providing radio access network 401 to terminal device 102. The attach request being a NAS message, network access node 110 passes the attach request to mobility management entity 4022 at the same stage 802. The attach request may in accordance with various aspects include terminal identification information for registering the terminal device at the core network 402. In accordance with various aspects, terminal identification information may include an International Mobile Subscriber Identity (IMSI). The IMSI can be used to identify a subscribed user of a radio communication network and can be a unique identification associated with the network. Terminal identification information may further include a Temporary Mobile Subscriber Identity (TMSI), which may be identity information assigned to a terminal device by the network. Terminal identification information may further include a Globally Unique Temporary UE Identity (GUTI) which in certain aspects may include a TMSI. In certain aspects, the GUTI may be identity information assigned to a terminal device by the mobility management entity. Terminal identification information may further include an International Mobile Equipment Identity (IMEI), which may uniquely identify terminal device hardware. The attach request transmitted at stage 802 may include terminal identification information for example in form of or including any one or more of an IMSI, a TMSI, a GUTI, and, for example in case of an emergency attach procedure, an IMEI, any one of these information items being suitable for identifying and registering the terminal device at the network.

Based on the received terminal identification information, in the exemplarily illustrated LTE case, the MME may request transmission of authentication information by the HSS 4024 at stage 804. At stage 806, the HSS 4024 responds for example by sending a corresponding authentication vector (which may in certain examples include e.g. a random number RAND, an expected response XRES, a local master key KASME and an authentication token AUTN) based on which MME 4022 and terminal device 102 may establish NAS security at stages 808 and 810. At stage 812, the MME 4022 transmits Attach Accept (an exemplary acknowledgement in response to the terminal identification information) to the terminal device 102 confirming registration of the terminal device at the core network 402.

In accordance with various aspects, terminal identification information may be employed for authenticating terminal devices for peer-to-peer communications. For example, vehicular communication devices (exemplary terminal devices) may be configured to set up direct peer-to-peer communication links for data exchange, e.g. for exchange of safety messages. Exemplary peer-to-peer communications may include in accordance with various aspects LTE V2V side link communications. In order to ensure security of such direct communication links (such that communication between terminal devices may not be corrupted by a non-authenticated device), a centralized infrastructure (for example base stations and/or road side units (RSUs)) may be configured to authenticate terminal devices for direct peer-to-peer communications.

Figure 9:
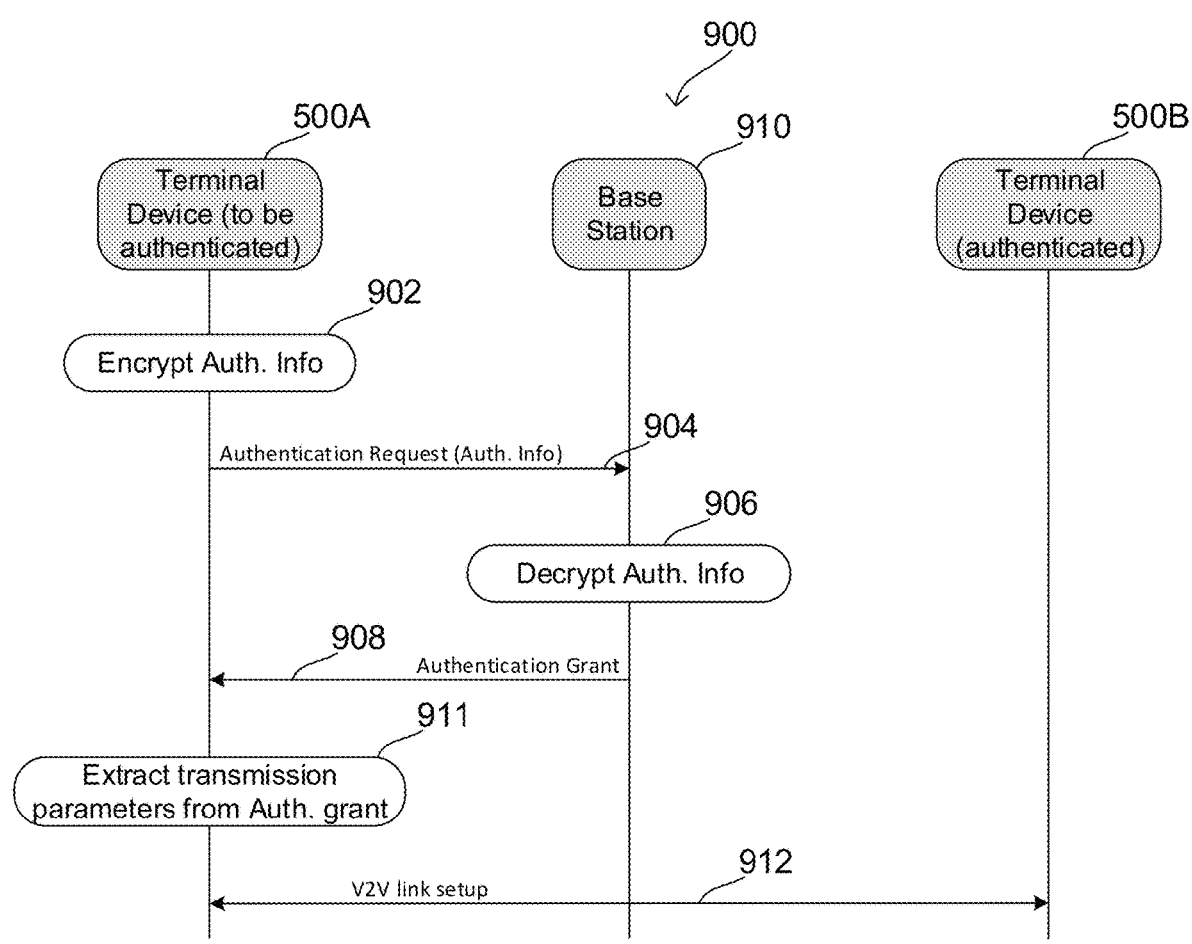
FIG. 9 shows an exemplary sequence of events which may be part of an authentication procedure according to some aspects.

FIG. 9 shows exemplary sequence of events 900 which may be part of an authentication procedure in accordance with various aspects. In FIG. 9, messages are exemplarily exchanged between a terminal device 500A to be authenticated, a base station 910 and a terminal device 500B that is already authenticated. Thereby, both the terminal device 500A to be authenticated and the terminal device 500B that is authenticated may be configured in line with terminal device (or vehicular communication device) 500 of FIG. 5 described above. Base station 910 may be any access node in line with access node 110 discussed above and may be for example any one of a 2G Base Transceiver Station (BTS), a 3G NodeB, a 4G Evolved NodeB (eNB) and/or a 5G gNB. Further, a terminal device in accordance with various aspects may be configured for V2X communications and a road side unit (RSU) may replace or supplement base station 910.

The terminal device 500A to be authenticated encrypts authentication information at stage 902. In accordance with various aspects, authentication information may correspond to or include terminal identification information and terminal device 500A may encrypt terminal identification information such as a unique terminal ID. As mentioned, terminal identification information may in accordance with various aspects be identification information suitable for registering and/or authenticating a terminal device at a network and thus for uniquely identifying a terminal device (as compared e.g. to a base station). Terminal identification information may in accordance with various aspects include for example an IMSI, a TMSI, a GUTI and/or an IMEI.

In accordance with various aspects, terminal device 500A may encrypt the terminal identification information at stage 902 based on an asymmetric encryption system (using an asymmetric encryption algorithm). Examples of asymmetric encryption systems may include in accordance with various aspects for example a Rivest-Shamir-Adleman (RSA) cryptosystem. Thus, in accordance with various aspects, the terminal device may encrypt the terminal identification device based on a cryptographic system that uses a public key and a private key. The terminal device may in such aspects encrypt the terminal identification information using the public key while the encrypted terminal identification information may only be decrypted (e.g. at the network side by a base station and/or by a different network node) using the private key.

At stage 904, terminal device 500A transmits an authentication request including the authentication information to the base station 910. The authentication request may in accordance with certain aspects correspond to or be included in an attach request by means of which terminal device 500A configured as vehicular communication device attempts registration at a core network to which base station 910 may be connected.

Having received the authentication request from terminal device 500A, base station 910 (in certain aspects e.g. a 5G gNB) may decrypt the encrypted terminal identification information using the private key at stage 906. In the example of FIG. 9, the base station 910 is an example of a node of a radio network assuming the role of an authentication master node. In alternative aspects, a network node may be a mobility management node such as a mobility management entity MME in an LTE radio communication network, a GPRS Support Node such as a Serving GPRS Support Node (SGSN) and/or a Gateway GPRS Support Node (GGSN) in a 3G radio communication network, and/or a node implementing corresponding functions in a radio communication network in accordance with a different radio communication technology. In certain aspects, terminal device 500A may also transmit the authentication request to a core network node such as a mobility management node via base station 910. For decrypting the terminal identification information, base station 910 may extract the private key from an authentication database which may be a database stored at the base station 910 and/or at a different node of the radio network. For example, in case of an LTE radio network, the authentication database may be stored at a home subscriber server HSS such as HSS 4024 of FIG. 8.

In case that decryption of the terminal identification information is successful at stage 906 (i.e. if a private key exists in the authentication database by means of which the terminal identification information can be successfully decrypted), base station 910 transmits an authentication grant message to terminal device 500A at stage 908. In accordance with certain aspects, the authentication grant message may include transmission parameters such as frequency and/or time allocation information for peer-to-peer communications between terminal device 500A and the already authenticated terminal device 500B. Terminal device 500A may extract such transmission parameters from the authentication grant at stage 911 and may start peer-to-peer communications (for example V2V sidelink communications) with terminal device 500B at stage 912 based thereon.

While authentication of a terminal device by a node of a centralized radio network assuming the role of an authentication master node may be suitable for providing reliable authentication and security, such authentication scheme may not be applicable to terminal devices traveling outside of coverage of base station 910. However, terminal devices such as for example V2V terminal devices may be configured to nevertheless establish links for direct communications, e.g. V2V communications, even though the terminal devices are not within coverage of base station 910. In view of this, various aspects of the present disclosure provide schemes for authenticating terminal devices that are not within coverage of base stations of a centralized radio communication network. In accordance with various aspects, a terminal device, in certain aspects a terminal device configured as vehicular communication device, assumes the role of a moving authentication master (MAM) device configured to authenticate further terminal devices that are not within coverage of a centralized radio communication network. Thereby, in accordance with certain aspects, autonomous authentication of terminal devices may become possible also in areas without network coverage while for example installation of road side units (RSUs) within such areas may be avoided.

In accordance with various aspects of the present disclosure, a moving authentication master device may be a terminal device configured as vehicular communication device, i.e. a wireless communication device that may connect to a core network of a radio communication network (e.g. to MME and HSS in an LTE case) only via a radio base station. In other words, as compared e.g. to base station 910 illustrated in FIG. 9, a MAM device in accordance with various aspects is a terminal device that never has a direct connection to a core network (e.g. core network 402) of a radio communication network. A MAM device may thus neither include any interface enabling communications between a base station and a core network (e.g. a MAM device according to various aspects does not include an LTE S1 interface) nor any interface enabling direct communications between base stations (e.g. a MAM device according to various aspects does not include an LTE X2 interface).

Schemes for authenticating communications of terminal devices in accordance with certain aspects may be bi-directional, i.e. a terminal device to be authenticated by a MAM device may in accordance with certain aspects be configured to verify the MAM device as true MAM device. Further, in accordance with aspects of the present disclosure, it may be possible to transfer the role of a MAM device from one terminal device to a different terminal device to extend a geographical region where authentication of terminal devices is possible even though terminal devices are not within coverage of a centralized radio communication network. In accordance with such aspects, an authentication database stored at a MAM device may be shared with a new MAM device being restricted based on geographical route information relating to the route the new MAM device intends to travel on. In this way, storing of unnecessary information at the new MAM device may be avoided such that sharing time and necessary hardware storage capacity at the new MAM device can be reduced.

Figure 10:
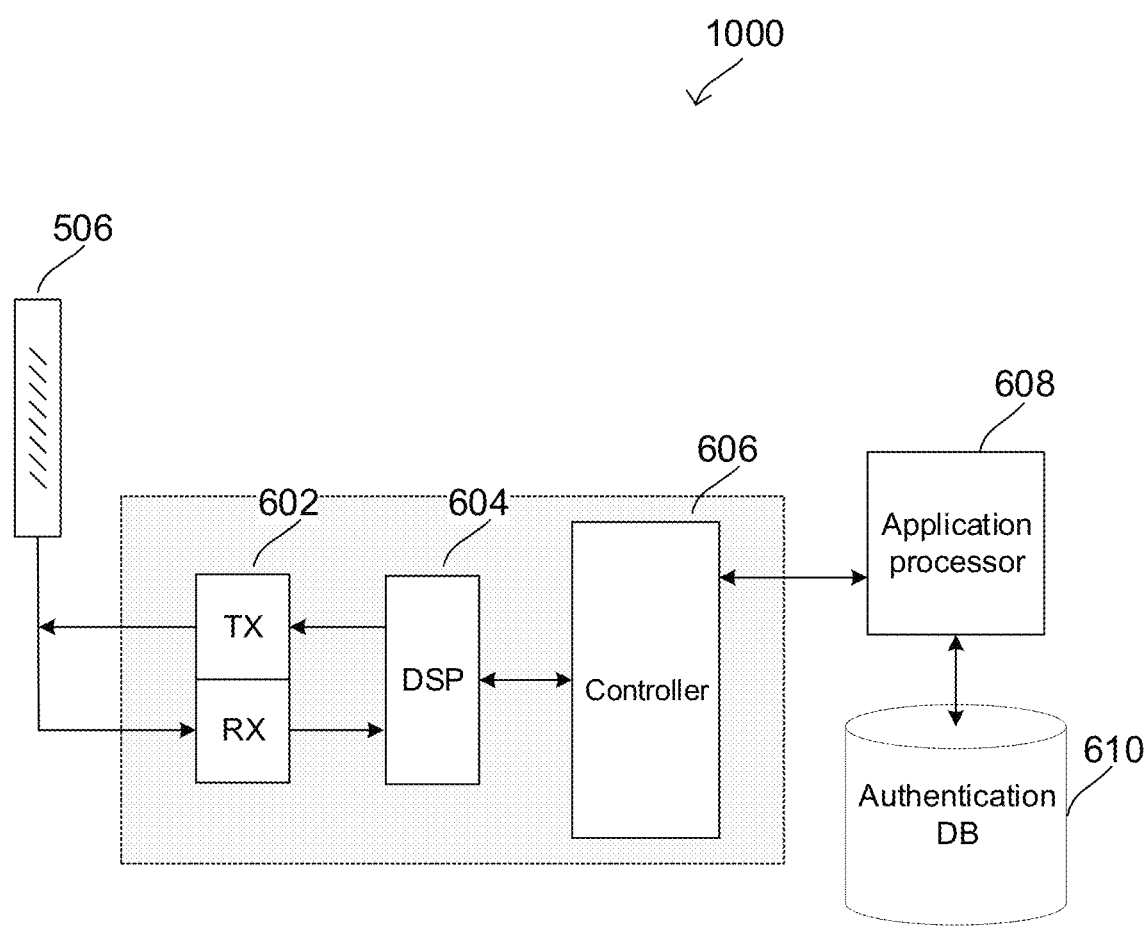
FIG. 10 shows an internal configuration of an antenna system and a radio communication arrangement according to some aspects.

FIG. 10 shows an internal configuration of antenna system 506 and radio communication arrangement 504 of FIG. 6 further including an application processor 608 coupled to controller 606 and an authentication data base (DB) 610 (an exemplary storage device storing decryption information) coupled to the application processor 608. The internal configuration of FIG. 10 may in accordance with various aspects be an internal configuration of a terminal device 1000 configured for vehicular communications and configured for assuming a role of a moving authentication master device.

As in the case of application processor 212 of terminal device 102, application processor 608 may be a CPU, and may be configured to handle the layers above the protocol stack, including the transport and application layers. Application processor 212 may be configured to execute various applications and/or programs of terminal device 500 at an application layer of terminal device 500, such as an operating system (OS), a user interface (UI) for supporting user interaction with terminal device 500, and/or various user applications. The application processor may interface with radio communication arrangement 504 and act as a source (in the transmit path) and a sink (in the receive path) for user data, such as voice data, audio/video/image data, messaging data, application data, basic Internet/web access data, etc. In the transmit path, controller 606 may therefore receive and process outgoing data provided by application processor 608 according to the layer-specific functions of the protocol stack, and provide the resulting data to digital signal processor 604. Digital signal processor 604 may then perform physical layer processing on the received data to produce digital baseband samples, which digital signal processor may provide to RF transceiver 602. RF transceiver 602 may then process the digital baseband samples to convert the digital baseband samples to analog RF signals, which RF transceiver 602 may wirelessly transmit via antenna system 506. In the receive path, RF transceiver 602 may receive analog RF signals from antenna system 506 and process the analog RF signals to obtain digital baseband samples. RF transceiver 602 may provide the digital baseband samples to digital signal processor 604, which may perform physical layer processing on the digital baseband samples. Digital signal processor 604 may then provide the resulting data to controller 606, which may process the resulting data according to the layer-specific functions of the protocol stack and provide the resulting incoming data to application processor 608. Application processor 608 may then handle the incoming data at the application layer, which can include execution of one or more application programs with the data and/or presentation of the data to a user via a user interface.

Authentication database 610 may be part of a memory or storage space provided at terminal device 1000 and may store decryption information for decrypting an authentication request and/or authentication information corresponding to or including terminal identification information. For example, decryption information may include private keys associated with terminal devices known to a corresponding communication network. Such private keys may be stored for terminal devices belonging to users registered at a network of a certain operator and/or at a network within a certain geographical area such as a state or a region. Private keys may be temporarily stored for terminal devices temporarily registered at a network of a certain operator and/or for a network within a certain geographical area. In accordance with certain aspects, the authentication database 610 may be pre-installed at a terminal device and may be dynamically updated, e.g. while a MAM terminal device is in or re-enters a region of coverage by a centralized radio communication network.

Figure 11:
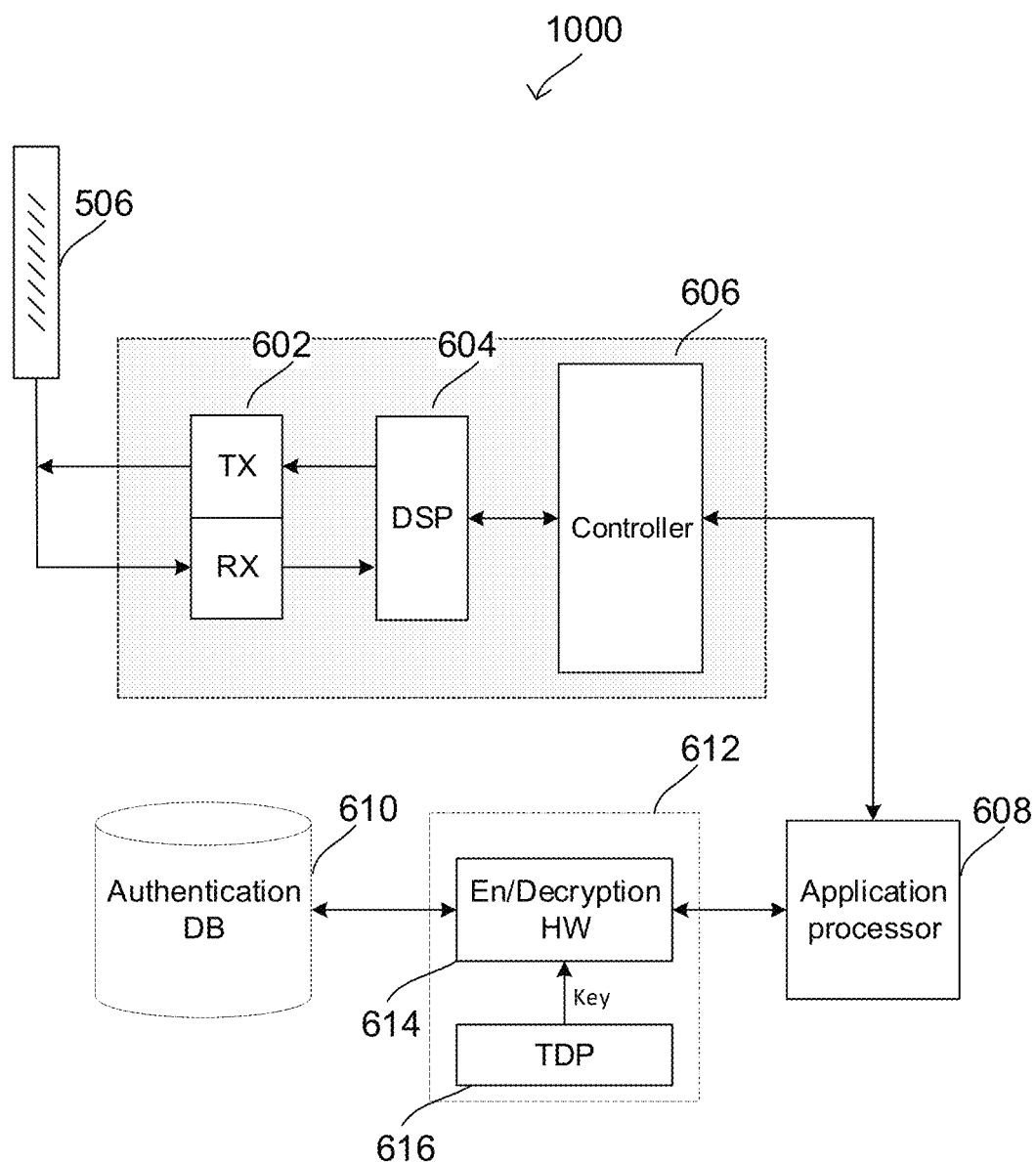
FIG. 11 shows an example of an internal configuration of a terminal device which may assume a role of a mobile authentication master (MAM) device according to some aspects.

FIG. 11 shows a further example of an internal configuration of a terminal device 1000 which may assume a role of a mobile authentication master (MAM) device. As shown in FIG. 11, in accordance with various aspects, an internal structure of a terminal device 1000 configured for vehicular communications, e.g. a police car, or a normal car configured for this purpose, may be configured for enhanced security. In accordance with such aspects, application processor 608 may be coupled to the authentication database 610 via a separate encryption/decryption hardware 614 and a tamper proof device (TDP) 616 which may be separately provided within a physically protected device 612 of a vehicle (for example similar to a flight recorder of an aircraft). Each of encryption/decryption hardware 614 and tamper proof device (TDP) 616 may be provided as separate standalone integrated circuits, e.g. as separate system on chip devices, or both encryption/decryption hardware 614 and tamper proof device (TDP) 616 may be provided within a single standalone integrated circuit, e.g. as a single system on chip device. In accordance with such aspects, the authentication database 610 may be separately encrypted. Decryption information (e.g. a private key) for decrypting encrypted authentication requests stored in the encrypted authentication database may be decrypted by the encryption/decryption hardware 614 using a key extracted from the TDP 616. The so decrypted key for decrypting the encrypted authentication request may then be transferred from the encryption/decryption hardware 614 to the application processor 608.

Figure 12:
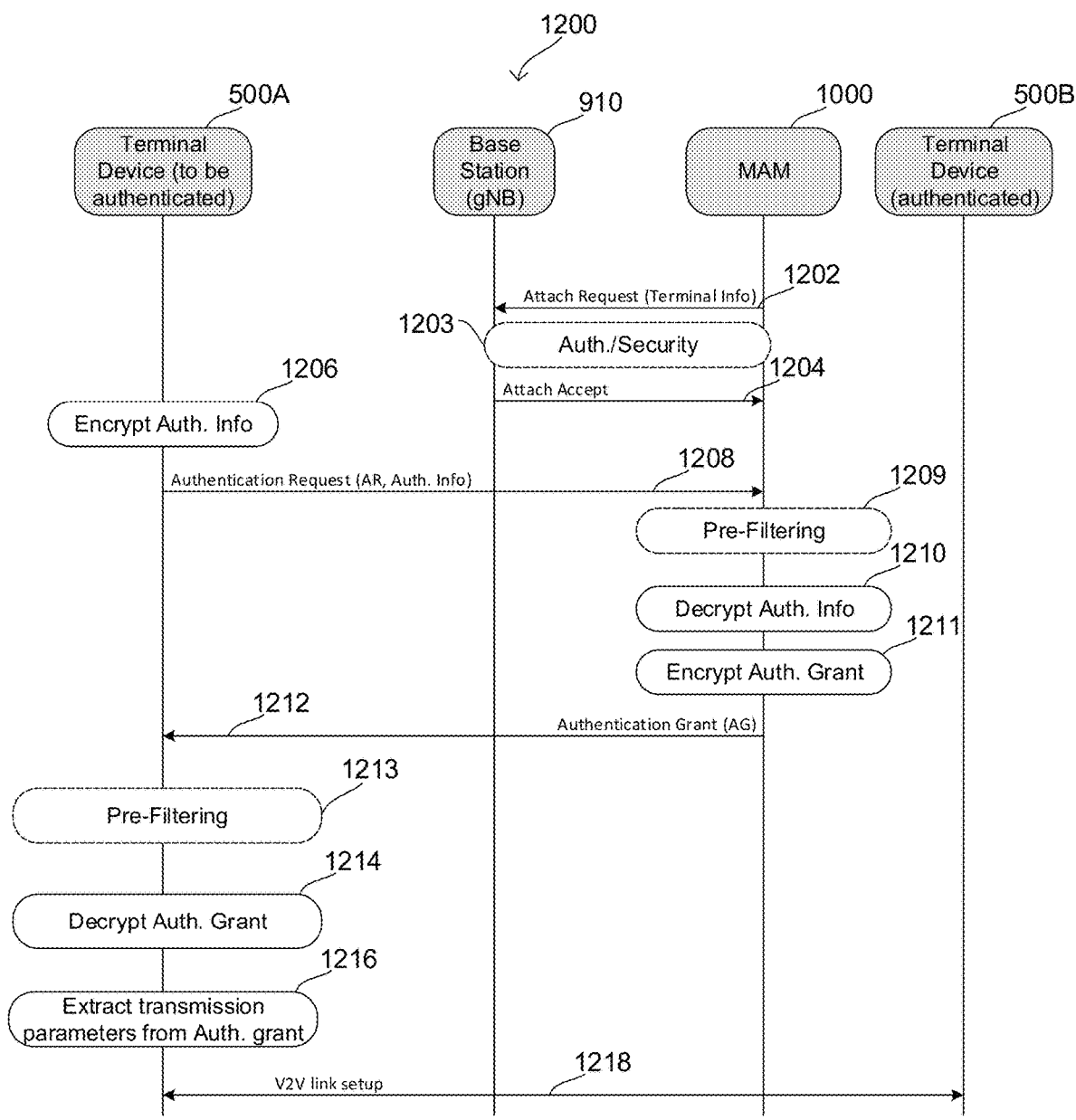
FIG. 12 shows an exemplary event sequence chart illustrating a scheme for authenticating a terminal device according to some aspects.

FIG. 12 shows an exemplary event sequence chart 1200 illustrating a scheme for authenticating terminal device 500A that is not within coverage of base station 910. In FIG. 12, terminal device 1000 assumes the role of a MAM device configured to authenticate terminal device 500A and terminal device 500B that are both not within coverage of base station 910, i.e. not within coverage of a centralized radio communication network. Thus, as compared for example to base station 110 of FIG. 7 which may act as a stationary authentication master node, terminal device 1000 assuming the role of the moving authentication master device may itself need to register at the centralized radio communication network for which base station 910 of FIG. 12 may provide radio access. Terminal device 1000 may need to register at the radio communication network for establishing communications within the radio network as well as for downloading and/or updating the authentication database.

Thus, in accordance with various aspects, a transmitter of the terminal device 1000 may be configured to transmit terminal identification information for authenticating the terminal device at a radio communication network to a node of the radio network, i.e. for example to the base station 910. In other words, as illustrated in FIG. 12, the terminal device 1000 may for example transmit terminal identification information such as an IMSI, a TMSI, a GUTI and/or an IMEI to base station 910 with an attach request at stage 1202. The attach request may be processed at base station 910 and/or may be transferred by base station 910 to a core network node as at stage 802 of FIG. 8. Terminal device 1000 may then take part in any authentication and/or security procedure with base station 910 and/or with the network (e.g. with a mobility management node of the network) via base station 910 as required for registering the terminal device 1000 at the network to which base station 910 is connected. When the terminal device 1000 is registered, base station 910 (or network via base station 910) transmits an attach accept (an exemplary acknowledgement in response to the terminal identification information) message to terminal device 1000 at stage 1204.

In accordance with various aspects, terminal device 1000 may assume the role of a moving authentication master (MAM) device after having performed the attach procedure with base station 910 (stages 1202 to 1204) and when certified. In accordance with various aspects, terminal device 1000 may be certified to assume the MAM role for example by base station 910 for example based on capability information of the terminal device 1000. Such capability information may be known to base station 910 for example via information exchange during the attach procedure. Capability information of a terminal device may in accordance with various aspects indicate software and/or hardware security capability of terminal device 1000 in relation to storage of decryption information and/or authentication/authentication information. For example, capability information may indicate whether or not terminal device 1000 includes security hardware for providing additional security for decryption information (e.g. for private keys) stored at the authentication database 610 such as a physically protected device 612 including the described encryption/decryption hardware 614 and the tamper proof device (TDP) 616. Capability information may further indicate capability of an application processor of terminal device 1000 to ensure security of decryption information, e.g. when updating the authentication database. Further, a terminal device may be certified for assuming a MAM role based on different attributes such as its function. For example, a vehicular communication device (terminal device) having the function of being a police car with hardware equipment for assuming a MAM role may be certified to assume the MAM role. Thus, being certified based on corresponding capability information and/or based on a different attribute, terminal device 1000 of FIG. 12 may assume the role of a MAM device.

Similar to actions performed at stage 902 of FIG. 9, terminal device 500A to be authenticated encrypts authentication information at stage 1206 which in accordance with various aspects may correspond to or include terminal identification information such as for example an IMSI, a TMSI, a GUTI and/or an IMEI. In accordance with various aspects, terminal device 500A may encrypt the terminal identification information based on an asymmetric encryption system using a respective public key known to terminal device 500A. At stage 1208, terminal device 500A may transmit an authentication request to MAM device 1000, the authentication request including the encrypted terminal identification information. In accordance with various aspects, terminal device 500A may transmit the authentication request by broadcasting the authentication request, for example via broadcasting channels supported by LTE sidelink based V2V. In other words, in accordance with various aspects, terminal device 500A may transmit the authentication request to MAM device 1000 via the Physical Side-Link Broadcast Channel (PSBCH) or via the Physical Side-Link Shared Channel (PSSCH). Alternatively, in accordance with certain aspects according to which the MAM device 1000 is for example known to terminal device 500A, terminal device 500A may also transmit the authentication request using a direct peer-to-peer communication link, e.g. using a direct V2V, side-link to MAM device 1000 at stage 1208.

Having received the authentication request from terminal device 500A, MAM device 1000 may in accordance with certain aspects perform a pre-filtering operation thereon at stage 1209 which will be described in detail below. When the authentication request has passed the pre-filtering, MAM device 1000 may decrypt the authentication information included in the authentication request at stage 1210. For example, application processor 608 may in accordance with various aspects be configured to decrypt terminal identification information included in the received authentication information using decryption information (e.g. a private key) extracted from authentication database 610 of FIG. 10 or from authentication database 610 of FIG. 11. For example, a vehicular communication device may in accordance with certain aspects be statically assigned a role of an authentication master device. For example, a police car may be equipped with respective devices for enhanced security, for example with the encryption/decryption hardware 614 and the tamper proof device (TDP) 616 separately provided within a physically protected device 612. In accordance with such aspects, also different cars provided with such devices for enhanced security may be statically assigned for assuming the role of an authentication master device. Further, as described below in detail, vehicular devices may in accordance with certain aspects also be dynamically assigned for assuming the role of an authentication master, in which case such vehicular device may not necessarily be equipped with devices for enhanced security.

Having decrypted the authentication request at stage 1210, MAM device 1000 may in accordance with various aspects transmit an authentication grant message (an acknowledgement for authenticating terminal device 500A for peer-to-peer-communications) to terminal device 500A at stage 1212. Being thus configured to only transmit the authentication grant message (the acknowledgement for authenticating terminal device 500A for peer-to-peer-communications) to terminal device 500A in case that the application processor 610 of MAM device 1000 has decrypted the authentication request, security of peer-to-peer communications, e.g. of V2V or V2X communications between vehicular communication devices in areas without network coverage can be enhanced.

In certain aspects, vehicular communication devices may not be provided with prior information regarding a MAM device within reach for direct peer-to-peer communication. Therefore, various aspects of the present disclosure may employ a bi-directional authentication scheme according to which a MAM device may on the one hand be configured for authenticating a vehicular communication device for communications e.g. outside of coverage of a centralized radio communication network, while on the other hand, the vehicular communication device may be configured for verifying trustability of the MAM device. Thus, in accordance with various aspects, MAM device 1000 may be configured to encrypt an authentication grant message at stage 1211 based on authentication information of terminal device 500A included in the authentication request received at stage 1208 and transmit an encrypted authentication grant to terminal device 500A at stage 1212. In accordance with certain aspects, MAM device 1000 may be configured to encrypt the authentication grant based on the terminal identification information included in or corresponding to the authentication information of terminal device 500A received at stage 1208 using a symmetric encryption algorithm. For example, MAM device 1000 may be configured to employ a Triple Data Encryption Algorithm (3DES) or an algorithm based on the Advanced Encryption Standard (AES) for encrypting the authentication grant message. The MAM device may be configured to symmetrically encrypt the authentication grant message using the terminal identification information included in the authentication request received from the terminal device 500A at stage 1208. As this unique identification information is known to terminal device 500A, terminal device 500A may decrypt the authentication grant at stage 1214 (in certain aspects after a pre-filtering stage 1213 discussed in detail above). The scheme being based on the unique terminal identification information, a terminal device 500A may thereby be capable of verifying the MAM device 1000 as being a trustable MAM device, i.e. for example as a MAM device being provided with authentication database 610 and thus as a MAM device that is guaranteed to have successfully decrypted the authentication request in advance to sending the authentication grant.

As mentioned, in accordance with certain aspects, the authentication grant message may include transmission parameters such as frequency and/or time allocation information for communications between terminal device 500A and the already authenticated terminal device 500B. Having received and decrypted the authentication grant at stage 1214, terminal device 500A may extract the transmission parameters from the authentication grant at stage 1216 and may set up a V2V communication link with terminal device 500B at stage 1218 based thereon.

Figure 13:
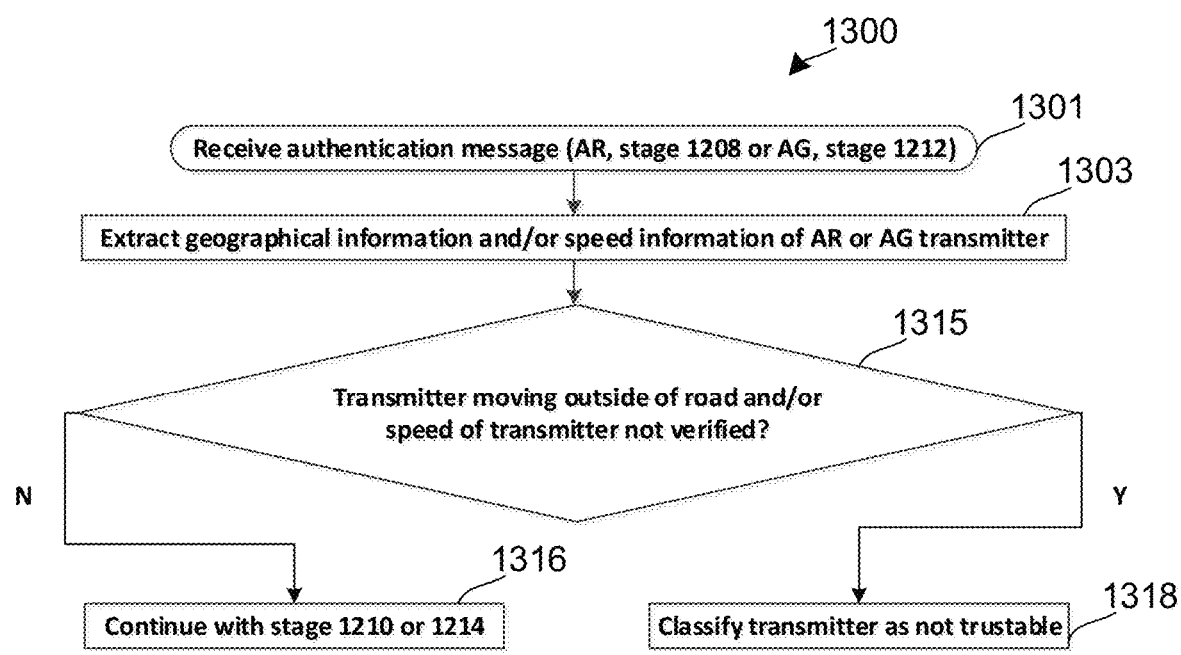
FIG. 13 conceptually illustrates pre-filtering of an authentication message by a respective receiver according to some aspects.

FIG. 12 illustrates the possibility of pre-filtering the authentication request (AR) received from terminal device 500A by the MAM device 1000 at stage 1209 and the possibility of pre-filtering the authentication grant (AG) received from the MAM device 1000 by terminal device 500A at stage 1213. Such pre-filtering of the AR message or the AG message by the respective receiver (the MAM 1000 in case of the AR message and the terminal device 500A in case of the AG message) is conceptually illustrated by the event sequence chart 1300 in FIG. 13. At stage 1301, the authentication message (the authentication request AR of stage 1208 in FIG. 12 or the authentication grant AG of stage 1212 in FIG. 12) is received (by the MAM device 1000 at stage 1208 or by the terminal device 500A at stage 1212).

To enable pre-filtering, in accordance with various aspects, the authentication message may include geographical information (position information) of the respective transmitter of the authentication message and/or speed information of the respective transmitter of the authentication message. In other words, in accordance with various aspects, the authentication request transmitted from the terminal device 500A to the MAM device 1000 may include geographical information and/or speed information of terminal device 500A. Further, in accordance with various aspects, the authentication grant message transmitted from the MAM device 1000 to the terminal device 500A may include geographical information and/or speed information of the MAM device 1000. In accordance with certain aspects, geographical information may be position or location information acquired from a respective positioning or navigation system, e.g. from a satellite based positioning system. In accordance with various aspects, speed information may correspond to an absolute speed of the transmitter of the authentication message, determined based on a speed sensor installed at the transmitter of the authentication message. At stage 1303, the respective receiver extracts the geographical information and/or the speed information from the authentication message. In other words, in certain aspects, the MAM device 1000 may be configured to extract geographical information and/or speed information of the terminal device 500A from the received authentication request at stage 1209 of FIG. 12. Further, in certain aspects, the terminal device 500A may be configured to extract geographical information and/or speed information of the MAM device 1000 at stage 1213 of FIG. 12.

Based on the extracted geographic information and/or the extracted speed information, the receiver of the authentication message (e.g. an application processor of terminal device 500A or of MAM device 1000) may determine at stage 1315, e.g. based on map data stored in a corresponding data base at the receiver of the authentication message (the terminal device 500A or the MAM device 1000), if the transmitter of the authentication message is a moving transmitter or a static transmitter outside of a road the receiver is traveling on. Alternatively or in addition, the receiver of the authentication message (e.g. an application processor of terminal device 500A or of MAM device 1000) may verify the extracted speed information at stage 1315, e.g. by additionally estimating a speed of the transmitter based on an estimated relative speed between transmitter and receiver, and by comparing the estimated speed to the extracted speed information. In the affirmative case ("Y" at stage 1315), the transmitter is classified as not trustable at stage 1318, and sequence 1200 of FIG. 12 may in such case terminate at stage 1209 (terminal device 500A not trustable) or at stage 1213 (MAM device 1000 not trustable). In other words, by such pre-filtering, a terminal device aside of a road on which vehicular communication devices are traveling and may potentially be exchanging safety messages via V2V side links, which may attempt to infiltrate and corrupt such V2V side link communications, can be recognized and classified as a not trustable transmitter. In case the transmitter of the authentication message is determined as not trustable, the receiver of the authentication message may thus be configured to discard the received authentication message. For example, the terminal device 500A may discard transmission parameters that may be included in the authentication grant message received at stage 1212. If the transmitter is determined to be moving in the same road as the receiver and/or if speed information included in the authentication message is confirmed to correspond to the transmitter's true speed ("N" at stage 1315), the transmitter is determined to be trustable at stage 1316 in which case sequence 1200 may continue at stage 1210 or at stage 1214 as described above.

Thus, by determining whether or not a transmitter of an authentication message is traveling on a road (the same road as the receiver, or e.g. a road parallel to the road the receiver is traveling on) and/or by determining if a transmitter's speed corresponds to speed information transmitted from said transmitter, a not trustable transmitter that may try to corrupt V2V communications on a road can be identified and ruled out as not trustable. It may thus become possible to mitigate security threats stemming from potential illegal corruption of V2V communication on a road from transmitters outside of a road.

Figure 14:
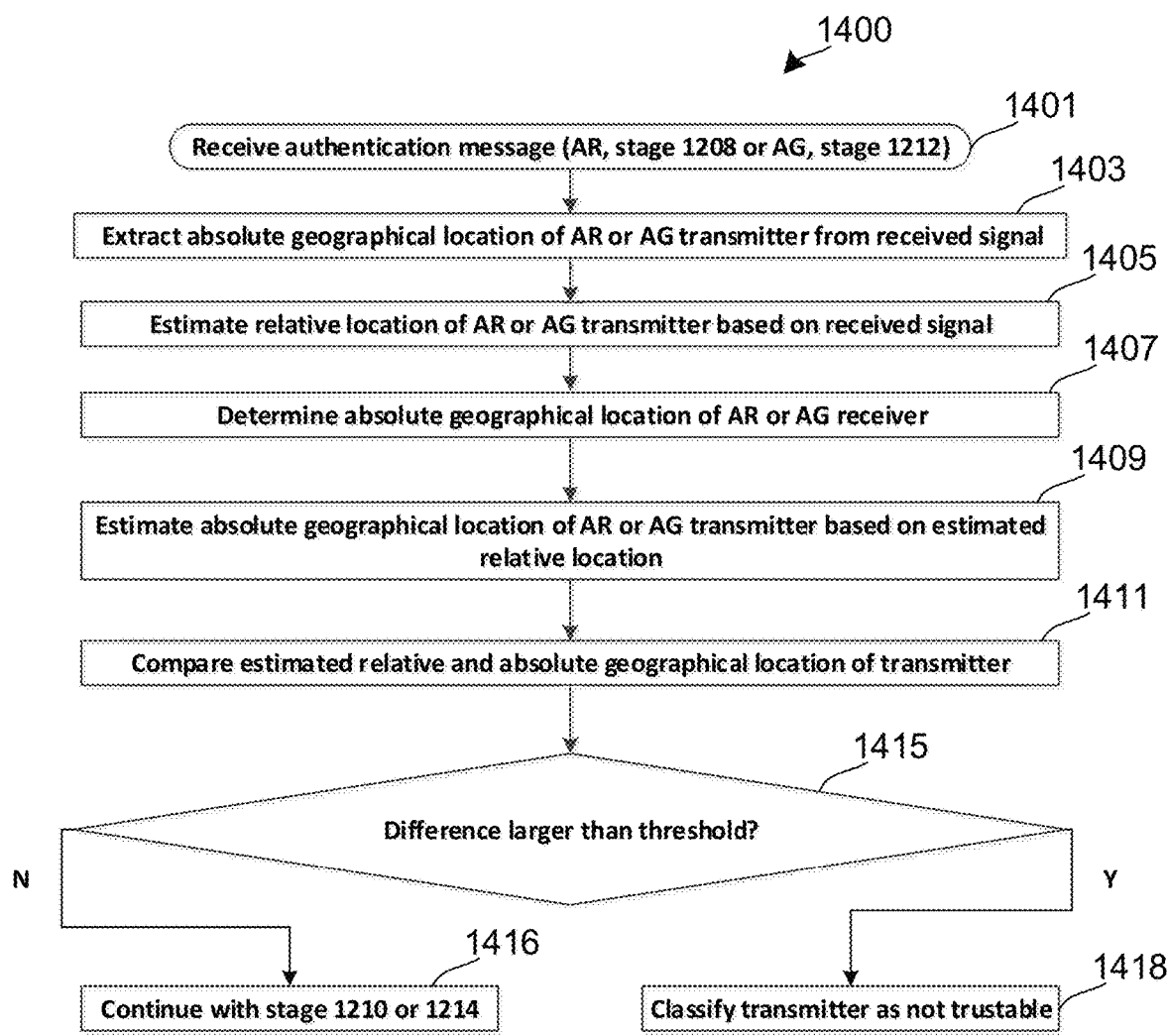
FIG. 14 shows a detailed sequence of events illustrating pre-filtering based on position information according to some aspects.

FIG. 14 shows a more detailed exemplary sequence of events 1400 illustrating pre-filtering based on extracted position information in accordance with various aspects of the present disclosure that may be employed at stages 1209 and 1213 of FIG. 12. Stages 1401 and 1403 of FIG. 14 correspond to stages 1301 and 1303 (first alternative) of FIG. 13 described above. As shown in FIG. 14, at stage 1405, the receiver of the authentication message (i.e. the MAM device 1000 receiving the AR message at stage 1208 of FIG. 12 or the terminal device 500A receiving the AG message at stage 1212 of FIG. 12) may be configured to estimate a relative position between the receiver of the authentication message and an actual position of the transmitter of the authentication message based on a corresponding received wireless signal.

For example, in accordance with certain aspects, application processor 608 of terminal device 1000 shown in FIGS. 10 and 11, and/or an application processor of terminal device 500 e.g. coupled to controller 606 (not shown in FIG. 6) may be configured to estimate a relative position of the transmitter of the authentication message by estimating an angle of arrival of the received wireless signal of the authentication message and a distance of the transmitter (based on an estimated propagation delay of the wireless signal). Based on the estimated angle of arrival and the distance of the transmitter, the application processor may then be configured to estimate a relative distance between the transmitter of the authentication message and the receiver of the authentication message.

At stage 1407, the receiver of the authentication message (the MAM device 1000 at stage 1208 of FIG. 12 or terminal device 500A at stage 1212 of FIG. 12) may extract its own geographical location (an absolute position) e.g. from a positioning system such as a satellite based positioning or navigation system installed at the receiver. The receiver may be configured to estimate at stage 1409 an absolute geographical location (estimated location) of the transmitter of the authentication message based on the own geographical location extracted at stage 1407 and based on the relative position estimated at stage 1405. At stage 1411, the receiver of the authentication message may further be configured to compare the extracted location (extracted absolute position) of the transmitter determined based on the position information extracted from the authentication message at stage 1403 to the estimated location (estimated absolute position) of the transmitter estimated at stage 1409 and to extract a difference value.

The receiver may compare the difference value to a predetermined threshold at stage 1415 to verify whether or not the absolute location information included in the authentication message is true or false information. In other words, if the difference value is determined to be above the predetermined threshold ("Y" at stage 1415) and if the position information included in the authentication information thus considerably deviates from position information estimated by the receiver of the authentication message, the transmitter is classified as not trustable at stage 1418, and sequence 1200 of FIG. 12 may in such case terminate at stage 1209 (terminal device 500A not trustable) or at stage 1213 (MAM device 1000 not trustable). If the difference value is determined to be below the predefined threshold ("N" at stage 1415), the transmitter is determined to be trustable at stage 1416 in which case sequence 1200 may continue at stage 1210 or at stage 1214 as described above. Thus, in accordance with various aspects, the receiver of the authentication message may be configured to verify the absolute location information included in the authentication message based on location information estimated based on the received wireless signal. In accordance with various aspects, application processor 608 of terminal device 1000 shown in FIGS. 10 and 11, and/or the application processor of terminal device 500 e.g. coupled to controller 606 may be configured to perform any one or all of stages 1407 to 1416/1418.

In accordance with various aspects, a receiver of an authentication message may be configured to store information on terminal devices and/or mark terminal devices which have been determined as not trustable by the pre-filtering ("Y" at stage 1315 and/or "Y" at stage 1415) on a blacklist, e.g. stored as part of an authentication database. For example, terminal identification information of a terminal device found to be not trustable may be stored in a dedicated memory or with a respective marker or flag marking the terminal identification information as belonging to a not trustable terminal device. Such blacklist may be shared among terminal devices (as dynamical information) and used e.g. before performing the described pre-filtering operation (i.e. for example before performing stages 1209 or 1213 in FIG. 12).

Figure 15:
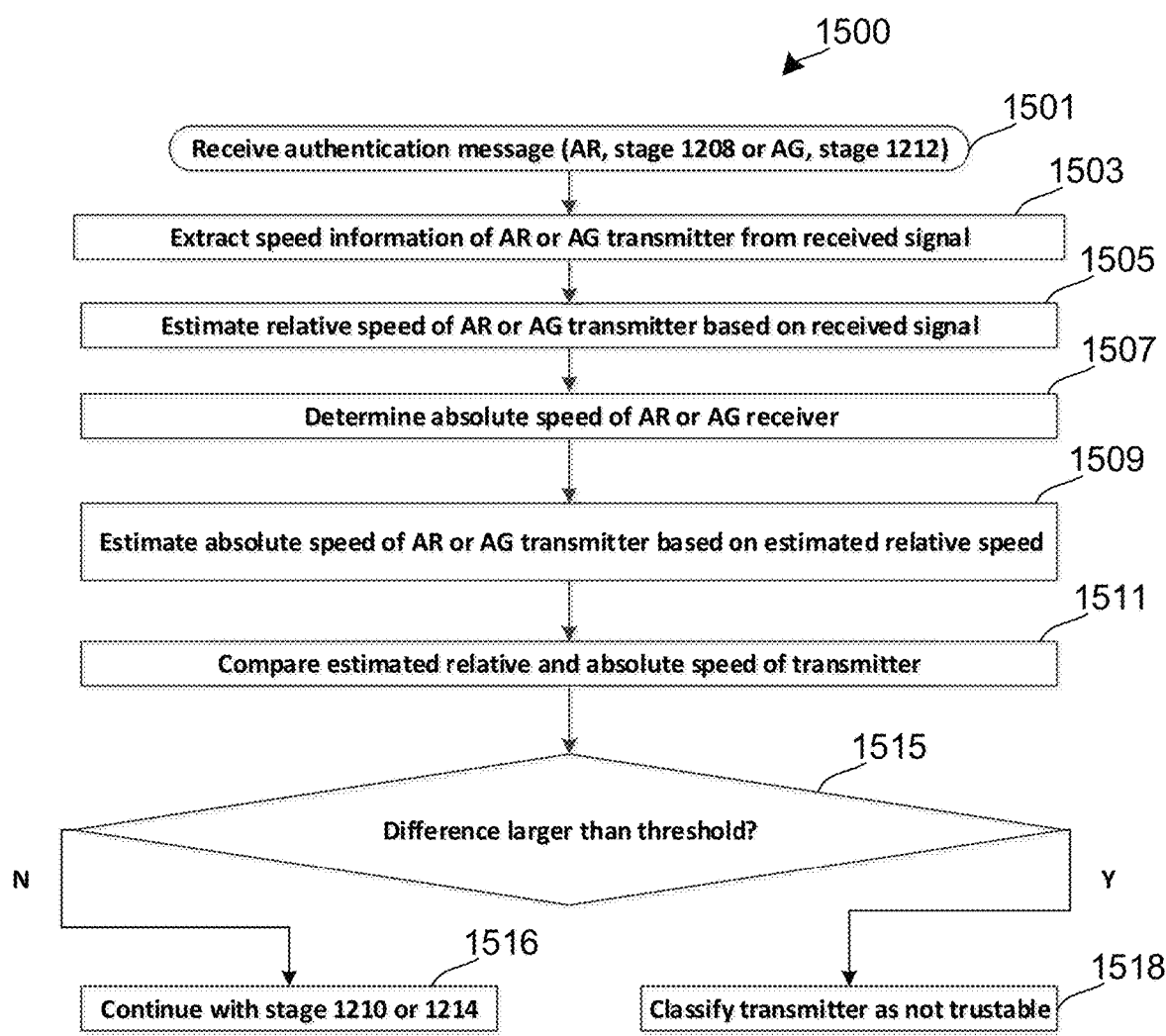
FIG. 15 shows a detailed sequence of events illustrating pre-filtering based on speed information according to some aspects.

FIG. 15 shows a more detailed exemplary sequence of events 1500 illustrating pre-filtering based on extracted speed information in accordance with various aspects of the present disclosure that may be employed at stages 1209 and 1213 of FIG. 12 alternatively or in addition to the sequence of events 1400 of FIG. 14. Stages 1501 and 1503 of FIG. 15 correspond to stages 1301 and 1303 (second alternative) of FIG. 13 described above. As shown in FIG. 15, at stage 1505, the receiver of the authentication message (i.e. the MAM device 1000 receiving the AR message at stage 1208 of FIG. 12 or the terminal device 500A receiving the AG message at stage 1212 of FIG. 12) may be configured to estimate a relative speed between the receiver of the authentication message and the transmitter of the authentication message based on a corresponding received wireless signal.

For example, in accordance with certain aspects, application processor 608 of terminal device 1000 shown in FIGS. 10 and 11, and/or an application processor of terminal device 500 e.g. coupled to controller 606 (not shown in FIG. 6) may be configured to estimate a relative speed of the transmitter of the authentication message with respect to the receiver of said message based on a Doppler shift/spread estimation of the received signal. Alternatively or in addition, the application processor 608 of terminal device 1000 shown in FIGS. 10 and 11, and/or an application processor of terminal device 500 e.g. coupled to controller 606 (not shown in FIG. 6) may be configured to estimate the relative speed of the transmitter based on a change of a position of the transmitter estimated as described in relation to stages 1405/1407 of FIG. 14 above per given time interval.

At stage 1507, the receiver of the authentication message (the MAM device 1000 at stage 1208 of FIG. 12 or terminal device 500A at stage 1212 of FIG. 12) may extract its own speed e.g. using a speed sensor installed at the receiver. The receiver may be configured to estimate at stage 1509 an absolute speed (estimated speed) of the transmitter of the authentication message based on the own speed extracted at stage 1507 and based on the relative speed estimated at stage 1505. At stage 1511, the receiver of the authentication message may further be configured to compare the extracted speed (extracted absolute speed) of the transmitter determined based on the speed information extracted from the authentication message at stage 1503 to the estimated speed (estimated absolute speed) of the transmitter estimated at stage 1509 and to extract a difference value.

The receiver may compare the difference value to a predetermined threshold at stage 1515 to verify whether or not the speed information included in the authentication message is true or false information. In other words, if the difference value is determined to be above the predetermined threshold ("Y" at stage 1515) and if the speed information included in the authentication information thus considerably deviates from a speed estimated by the receiver of the authentication message, the transmitter is classified as not trustable at stage 1518, and sequence 1200 of FIG. 12 may in such case terminate at stage 1209 (terminal device 500A not trustable) or at stage 1213 (MAM device 1000 not trustable). If the difference value is determined to be below the predefined threshold ("N" at stage 1515), the transmitter is determined to be trustable at stage 1516 in which case sequence 1200 may continue at stage 1210 or at stage 1214 as described above. Thus, in accordance with various aspects, the receiver of the authentication message may be configured to verify the speed information included in the authentication message based on a speed estimated based on the received wireless signal. In accordance with various aspects, application processor 608 of terminal device 1000 shown in FIGS. 10 and 11, and/or the application processor of terminal device 500 e.g. coupled to controller 606 may be configured to perform any one or all of stages 1507 to 1516/1518.

As mentioned above, MAM device 1000 may be configured (e.g. application processor 608 of MAM device 1000 in FIG. 10 or FIG. 11 may be configure) to decrypt an authentication request received from a terminal device to be authenticated (e.g. at stage 1208 from terminal device 500A) using decryption information (e.g. a private key) extracted from authentication database 610. In accordance with various aspects, the authentication database 610 may be pre-installed at a terminal device. For example, a vehicle such as a police car or a vehicle selected for the purpose to serve as a MAM device may be provided with a dedicated storage onto which the authentication database is pre-installed. Such pre-installed database may include decryption information (e.g. private keys) corresponding to vehicular communication devices (terminal devices) registered for example in a predefined geographical region such as an entire state or the like. Alternatively, in certain aspects it may be possible that an authentication database (e.g. including decryption information such as private keys corresponding to vehicular communication devices (terminal devices) registered for example in a predefined region such as an entire state or part of a state) may be downloaded from a wireless network into a storage device of a standard vehicular communication device such as a regular car or motorcycle, e.g. via a base station after a MAM device has performed an attach procedure with a base station.

In accordance with certain aspects, an authentication database (for example a pre-installed and/or a downloaded authentication database) may be dynamically updated. Updates to an authentication database may include decryption information such as private keys corresponding to vehicular communication devices that have been registered in the predefined geographical region after the authentication database has been pre-installed and/or downloaded. Such vehicular communication devices may include for example vehicles only temporally registered for a certain geographical region when for example crossing the geographical region while traveling to a certain destination outside of the geographical region. Updates may further include entries into a blacklist or updates of a blacklist of vehicular communication devices (terminal devices) determined by different MAMs to be not trustable. As mentioned, such blacklist may be stored at a MAM as part of an authentication database.

Figure 16:
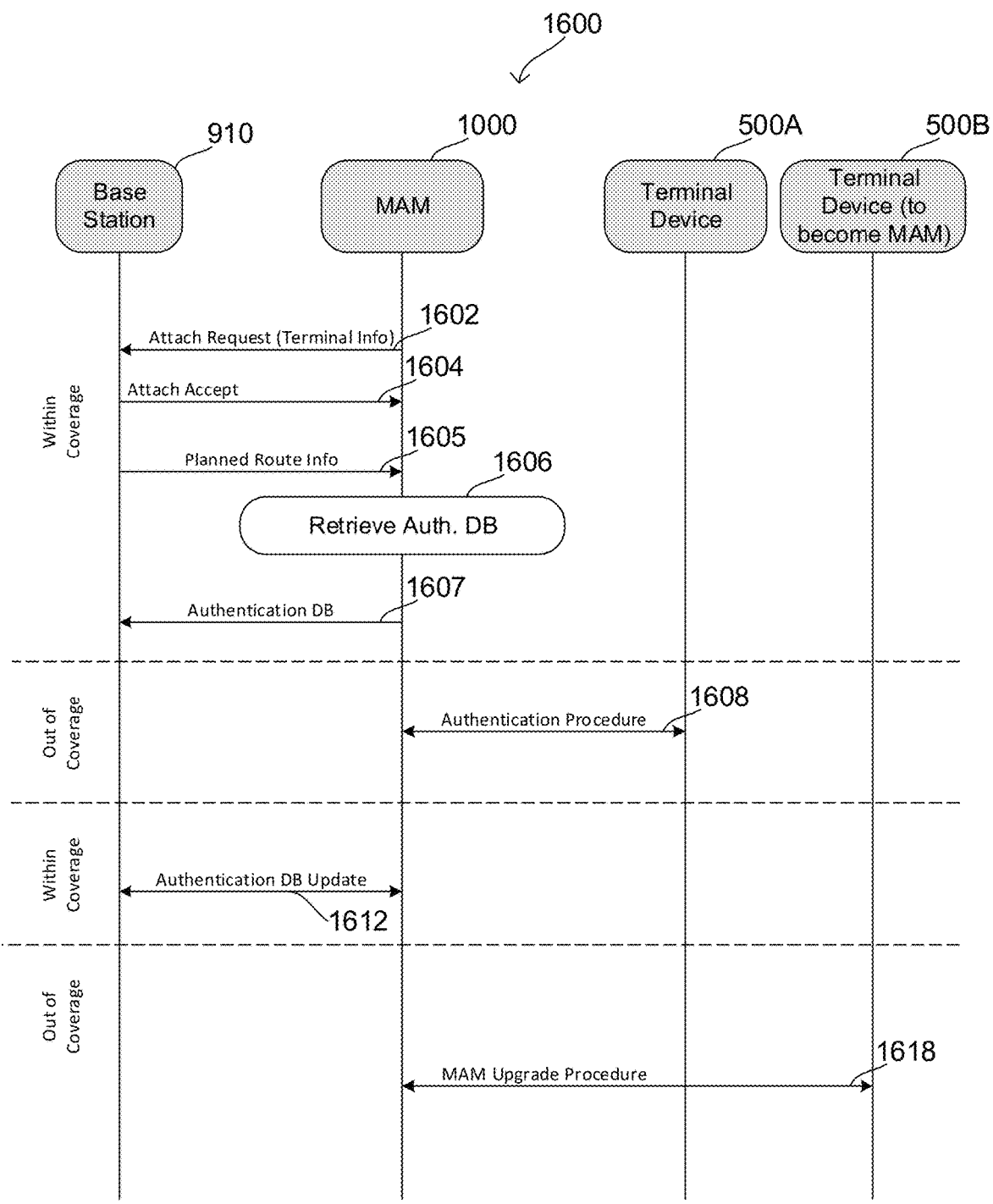
FIG. 16 shows an exemplary sequence chart illustrating exemplary update processes according to some aspects.

Terminal devices assuming the role of a moving authentication master (MAM devices) may in accordance with certain aspects be configured to update an authentication database (and/or a blacklist) when being within coverage of a centralized radio communication network via an access network provided by a base station. FIG. 16 shows exemplary sequence chart 1600 illustrating exemplary update processes. At stages 1602 and 1604, MAM device 1000 and base station 910 may perform an attach procedure as described above (stages 1202 to 1204 of FIG. 12). Thus, MAM device 1000 may transmit at stage 1602 an attach request including terminal device identification information to base station 910 which may be answered by base station 910 with an attach accept message at stage 1604 (the attach accept message originating from the base station 910 or from a core network node being transferred by base station 910).

At stages 1605 to 1607, while MAM device 1000 is within coverage of base station 910, MAM device 1000 and base station 910 may perform an update of an existing authentication database 610 stored at MAM device 1000 or may newly store authentication database at MAM device 100. Decryption information (e.g. private keys) of vehicular communication devices not yet stored e.g. in a pre-installed authentication database of MAM device 1000 may be uploaded onto a corresponding storage at MAM device 1000. Further, a blacklist of vehicular communication devices not to be trusted may be updated or installed for the first time at MAM device 1000. Vehicular communication devices not to be trusted may be identified in the blacklist (e.g. a sub-database of authentication database 610) by corresponding terminal identification information.

In accordance with various aspects, updates of the authentication database may be based on route information of a route the MAM device 1000 intends to travel on. For example, before receiving the authentication database or the authentication database update from base station 910, terminal device 1000 may transmit geographical information indicating a route terminal device 1000 intends to travel on to base station 910 at stage 1605. Such geographical information may in accordance with certain aspects be retrieved from a navigation system installed at terminal device 1000. Base station 910 may then retrieve a partial authentication database from the core network including decryption information or signatures (e.g. private keys) of vehicular communication devices expected to be within a geographical region including the route that the terminal device 1000 intends to travel on at stage 1606. Thus, as mentioned above, MAM device 1000 in accordance with various aspects of the present disclosure may not include any direct link to a core network but has to rely on the wireless radio access network provided by base station 910 to retrieve information such as authentication database updates from the core network. Base station 910 may avoid retrieving signatures (e.g. private keys) relating to geographical regions unrelated to the route terminal device 1000 intends to travel on. Vehicular communication devices may be expected to be within a geographical region for example if registered at the network to which base station 910 is connected to for this geographical region. At stage 1607, base station 910 may transmit the retrieved partial authentication database to terminal device 1000. In this way, it may be possible to avoid storing of unnecessary information and waste of storage space at the MAM device 1000.

When MAM device 1000 travels out of coverage of base station 910, MAM device 1000 may perform authentication procedures (e.g. by going through stages 1206 to 1214 of FIG. 12) with terminal devices similarly traveling outside of network coverage by referring to authentication database 610. For example, MAM device 1000 may authenticate terminal device 500A for communications with further terminal devices (not shown) that are out of network coverage at stage 1608.

When MAM device 1000 reenters an area covered by a radio communication network, e.g. when MAM device 1000 reenters an area covered by base station 910, MAM device 1000 may update the authentication database 610 at stage 1612. Such update may be initiated by a request for the update transmitted from MAM device 1000 to base station 910. Alternatively, such update may be automatically initiated by base station 910 when detecting that MAM device 1000 has reentered an area of network coverage, e.g. when MAM device 1000 re-attaches and/or reconnects to base station 910.

Figure 17:
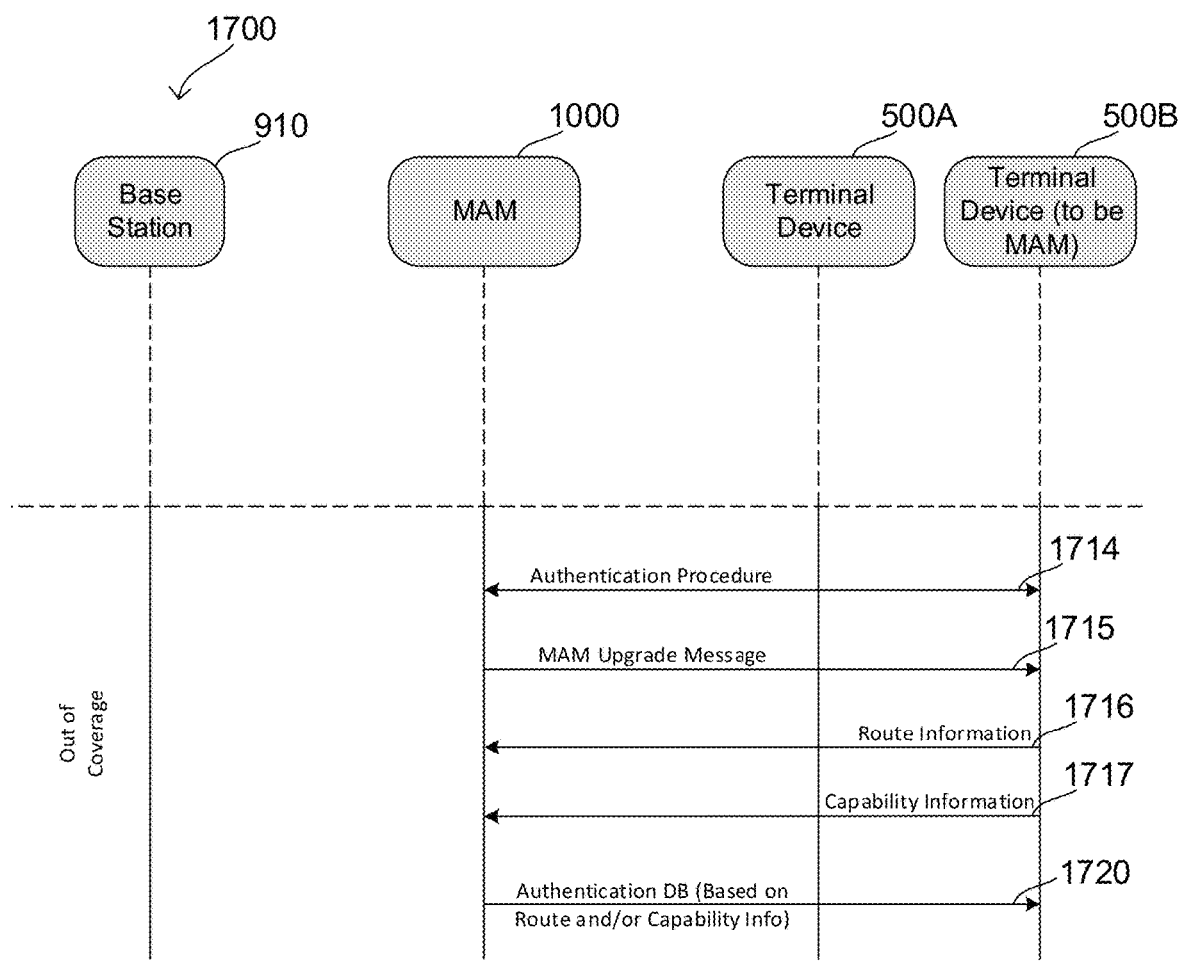
FIG. 17 illustrates sharing of a MAM role according to some aspects.

An area within which terminal devices may be authenticated for communications via base station 910 can be increased by an area within which MAM device 1000 travels. In accordance with various aspects of the present disclosure, such area can be further increased by an area within which e.g. terminal device 500B travels by sharing the MAM role between terminal device 1000 and terminal device 500B at stage 1618. Such sharing of the MAM role at stage 1618 is exemplarily illustrated in more detail in sequence chart 1700 representing stage 1618 in FIG. 17. In accordance with various aspects, MAM device 1000 and terminal device 500B may first perform an authentication procedure at stage 1714. In this way, in accordance with certain aspects, terminal device 500B may be confirmed to be a terminal device that can be trusted. At stage 1715, MAM device 1000 may transmit a MAM upgrade message (e.g. an upgrade request) to terminal device 500B. Such MAM upgrade message may in accordance with certain aspects be a message broadcasted by MAM device 1000 for example when reaching an end point of a route MAM device 1000 intends to travel on or when interrupting its travel. Alternatively or in addition, such message may be broadcasted periodically by MAM device 1000.

Terminal device 500B may in accordance with certain aspects respond by transmitting geographical route information indicating a route the terminal device 500B intends to travel on at stage 1716. Further, in certain aspects, terminal device 500B may respond alternatively or in addition by transmitting capability information at stage 1717. As mentioned, capability information of a terminal device may in accordance with various aspects indicate software and/or hardware security capability of terminal device 1000 in relation to storage of authentication information as described above. At stage 1720, MAM device 1000 may share contents of its authentication database based on the received route information and/or based on the received capability information. In accordance with various aspects, MAM device 1000 may for example share only a limited content of its authentication database based on a route terminal device 500B intends to travel on. In this way, necessary storage capacity at terminal device 500B and necessary time for database sharing may be reduced while an area within which authentication of terminal devices is possible may be increased by the area of travel of terminal device 500B. Further, if MAM device 1000 receives for example more than one responses to a MAM upgrade request message broadcasted at stage 1715, the MAM device 1000 may be configured to select a new MAM device based on the route information taking into account also the capability information. For example, the MAM device may select a terminal device with highest security level as being a new MAM device. A MAM device may further select more than one new MAM devices based on different geographical information such that a larger area can be covered while still preferring MAM devices with higher security level if possible.

Figure 18:
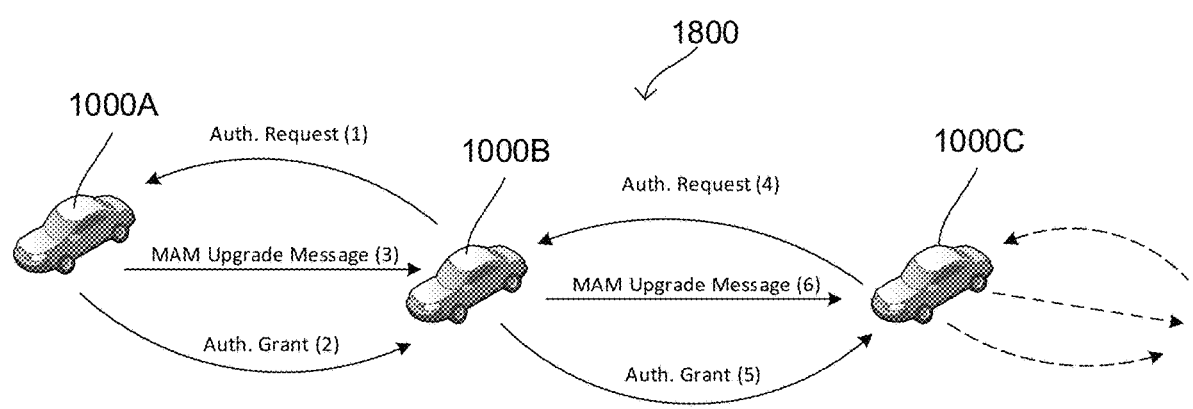
FIG. 18 shows a sequence of vehicular communication devices conceptually illustrating authentication database sharing according to some aspects.

FIG. 18 shows sequence of vehicular communication devices 1800 conceptually illustrating authentication database sharing in accordance with various aspects. As shown, a MAM device 1000A may perform an authentication procedure with terminal device 1000B by responding to an authentication request (1) received from terminal device 1000B with an authentication grant (2). When terminal device 1000B is authenticated (and thus confirmed as terminal device to be trusted) MAM device 1000A may transmit a MAM upgrade message (3), e.g. a MAM upgrade request to terminal device 1000B. As mentioned, in accordance with various aspects, communications between MAM device 1000A and terminal device 1000B may be performed via a direct communication link, for example via a V2V or V2X side link communication link. Further, for example a MAM upgrade message transmitted from MAM device 1000 may be transmitted using a broadcast channel (e.g. via the PSSCH or the PSBCH) and may be responded by a terminal device being capable to become a MAM device. In FIG. 18, terminal device 1000B may respond to the MAM upgrade message (3) by transmitting geographical information relating to a route terminal device 1000B intends to travel on and/or capability information of terminal device 1000B. Based on the geographical information and/or the capability information, terminal device 1000A may then share contents of its authentication database with terminal device 1000B which then becomes a new MAM device. In a similar way, the new MAM device 1000B may upgrade a further terminal device 1000C. Such dynamic upgrading of terminal devices may continue as indicated by the dotted arrows in the figure, whereby authentication for communications between vehicular communication devices becomes possible within an extended area not covered by a centralized network.

Thus, in accordance with various aspects, vehicular communication devices may assume a role of a Moving Authentication master (MAM) and may authenticate further vehicular communication devices traveling in areas out of coverage by a radio communication network. In accordance with various aspects, for example an authentication grant message can be encrypted by a MAM device to enable an autonomous bi-directional authentication scheme which may further increase security of communications. While certain vehicular communication devices such as police cars or the like may be statically assigned a MAM role, in accordance with various aspects, vehicular communication devices may be dynamically assigned a MAM role whereby authentication databases may be shared between MAM devices and terminal devices to become MAM devices based on geographical information on routes the terminal devices designated to become MAM devices intend to use. Thus, in accordance with various aspects of the present disclosure it may become possible to authenticate communications for example using direct V2V or V2X communication links between vehicular communication devices traveling outside of coverage of a radio communication network.

The following examples pertain to further aspects of this disclosure:

Example 1 is a terminal device comprising: a transmitter configured to transmit terminal identification information for identifying the terminal device to a base station of a radio communication network; a receiver configured to receive an acknowledgment from the base station in response to the terminal identification information, and to receive an authentication request for authenticating a further terminal device for peer-to-peer communications from the further terminal device; the transmitter being configured to transmit an acknowledgement to the further terminal device for authenticating the further terminal device for the peer-to-peer communications.

In Example 2, the subject matter of Example 1 can optionally include wherein the receiver is configured to extract position information of the further terminal device from the authentication request, and wherein the terminal device further comprises an application processor configured to determine whether or not the further terminal device is located on a road based on the position information, and wherein the transmitter is configured to transmit the acknowledgement to the further terminal device if the further terminal device is determined to be located on the road.

In Example 3, the subject matter of Example 2 can optionally include wherein the application processor is configured to estimate a relative position of the further terminal device in relation to the terminal device from a wireless signal including the authentication request received from the further terminal device, and to compare a difference between an estimated location of the further terminal device determined based on the estimated relative position and an extracted location of the further terminal device determined based on the position information extracted from the authentication request with a predefined threshold, wherein the transmitter is configured to transmit the acknowledgement to the further terminal device if the difference is below the predefined threshold.

In Example 4, the subject matter of Example 3 can optionally include further comprising a positioning system configured to determine an absolute position of the terminal device, wherein the application processor is configured to determine the estimated location of the further terminal device based on the estimated relative position and based on the absolute position of the terminal device.

In Example 5, the subject matter of any one of Examples 1 to 4 can optionally include further comprising a positioning system configured to determine an absolute position of the terminal device, wherein the transmitter is configured to transmit the acknowledgement to the further terminal device including the absolute position of the terminal device.

In Example 6, the subject matter of any one of Examples 1 to 5 can optionally include wherein the receiver is configured to extract a speed of the further terminal device from the authentication request, and wherein the terminal device further comprises an application processor configured to verify the extracted speed of the further terminal device, and wherein the transmitter is configured to transmit the acknowledgement to the further terminal device if the application processor verifies the extracted speed of the further terminal device.

In Example 7, the subject matter of Example 6 can optionally include wherein the application processor is configured to estimate a relative speed of the further terminal device in relation to the terminal device from a wireless signal including the authentication request received from the further terminal device, and to compare a difference between an estimated speed of the further terminal device determined based on the estimated relative speed of the further terminal device and the extracted speed of the further terminal device to a predefined threshold, and wherein the transmitter is configured to transmit the acknowledgement to the further terminal device if the difference is below the predefined threshold.

In Example 8, the subject matter of Example 7 can optionally include further comprising a speed sensor configured to determine an absolute speed of the terminal device, wherein the application processor is configured to determine the estimated speed of the further terminal device based on the estimated relative speed and based on the absolute speed of the terminal device.

In Example 9, the subject matter of any one of Examples 1 to 8 can optionally include further comprising: a storage device storing decryption information for decrypting the authentication request; and an application processor configured to decrypt the authentication request based on the decryption information.

In Example 10, the subject matter of Example 9 can optionally include wherein the decryption information includes a plurality of decryption keys, each decryption key being associated with a corresponding further terminal device and being stored for decrypting an authentication request from the corresponding further terminal device.

In Example 11, the subject matter of Example 10 can optionally include wherein each decryption key is associated with the corresponding further terminal device and suitable for uniquely decrypting an authentication request from only the corresponding further terminal device.

In Example 12, the subject matter of any one of Examples 9 to 11 can optionally include wherein the transmitter is configured to transmit the acknowledgement to the further terminal device if the application processor has decrypted the authentication request.

In Example 13, the subject matter of any one of Examples 2 to 12 can optionally include wherein the application processor is configured to encrypt the acknowledgement based on authentication information of the further terminal device included in the received authentication request.

In Example 14, the subject matter of Example 13 can optionally include wherein the authentication information includes terminal identification information of the further terminal device.

In Example 15, the subject matter of any one of Examples 13 or 14 can optionally include wherein the application processor is configured to encrypt the acknowledgement using a symmetric encryption algorithm.

In Example 16, the subject matter of any one of Examples 2 to 15 can optionally include wherein the application processor is configured to decrypt the authentication request using an asymmetric encryption algorithm, and wherein the decryption information for decrypting the authentication request is a private key corresponding to the further terminal device.

In Example 17, the subject matter of Example 16 can optionally include wherein the authentication request includes terminal identification information of the further wireless device encrypted by an asymmetric encryption algorithm.

In Example 18, the subject matter of any one of Examples 9 to 17 can optionally include wherein the application processor is coupled to the storage device storing decryption information via an encryption/decryption hardware configured to decrypt the decryption information.

In Example 19, the subject matter of Example 18 can optionally include wherein the encryption/decryption hardware is configured to retrieve a key for decrypting decryption information stored in the storage device from a tamper proof device and to decrypt the decryption information based on the retrieved key.

In Example 20, the subject matter of any one of Examples 18 to 19 can optionally include wherein the encryption/decryption hardware and the tamper proof device are included in a physically protected device of a vehicle.

In Example 21, the subject matter of any one of Examples 1 to 20 can optionally include wherein the terminal device is configured as vehicular communication device, and wherein the transmitter is further configured to transmit geographical information relating to a travel route of the terminal device to the base station.

In Example 5, the subject matter of Example 21 can optionally include wherein the geographical information is retrieved from a navigation system of the terminal device.

In Example 23, the subject matter of any one of Examples 21 to 22 can optionally include wherein the receiver is configured to receive decryption information from the base station and to store the decryption information in the storage device.

In Example 24, the subject matter of Example 23 can optionally include wherein the decryption information includes terminal identification information relating to vehicular communication devices registered at the radio communication network in relation to a geographical area corresponding to the geographical information.

In Example 25, the subject matter of any one of Examples 1 to 24 can optionally include wherein the transmitter is configured to transmit an upgrade request at least to the further terminal device for requesting transmission of decryption information stored at the storage device of the terminal device to at least the further terminal device.

In Example 26, the subject matter of Example 25 can optionally include wherein the transmitter is configured to broadcast the upgrade request.

In Example 27, the subject matter of Example 26 can optionally include wherein the terminal device is configured as LTE V2V vehicular communication device and is configured to broadcast the upgrade request via a Physical Side-Link Shared Channel (PSSCH).

In Example 28, the subject matter of any one of Examples 25 to 27 can optionally include wherein the receiver is configured to receive geographical route information indicating a travel route of the further terminal device and/or capability information indicating a software and/or hardware security capability of the further terminal device to store decryption information in response to the upgrade request.

In Example 29, the subject matter of Example 28 can optionally include wherein the transmitter is configured to transmit decryption information stored at the storage device of the terminal device to at least the further terminal device based on the geographical route information and/or the capability information.

In Example 30, the subject matter of any one of Examples 1 to 29 can optionally include wherein the terminal identification information includes one or more of an International Mobile Subscriber Identity (IMSI), a Temporary Mobile Subscriber Identity (TMSI), a Globally Unique Temporary UE Identity (GUTI) or an International Mobile Equipment Identity (IMEI).

In Example 31, the subject matter of any one of Examples 1 to 30 can optionally include being configured as vehicular communication device.

In Example 32, the subject matter of any one of Examples 1 to 31 can optionally include wherein the terminal device does not comprise any direct link to a core network of the radio communication network.

In Example 33, the subject matter of any one of Examples 1 to 32 can optionally include wherein the terminal device is configured for LTE V2V communications with the base station and for LTE V2V sidelink communications with the further terminal device.

In Example 34, the subject matter of any one of Examples 1 to 33 can optionally include wherein the transmitter is configured to transmit the terminal identification information with an attach request message, and wherein the receiver is configured to receive the acknowledgement from the base station with an attach accept message.

In Example 35, the subject matter of any one of Examples 1 to 34 can optionally include wherein the transmitter is configured to transmit the acknowledgement to the further terminal device for authenticating the further terminal device for LTE V2V sidelink communications.

In Example 36, the subject matter of any one of Examples 1 to 35 can optionally include wherein the transmitter is configured to transmit an acknowledgement to the further terminal device when the terminal device is outside of coverage of a radio access network provided by the base station.

Example 37 is a terminal device comprising: an application processor configured to encrypt authentication information of the terminal device; a transmitter configured to transmit an authentication request including the encrypted authentication information for authenticating the terminal device for peer-to-peer communications to a further terminal device; a receiver configured to receive an acknowledgement for authenticating the terminal device for the peer-to-peer communications from the further terminal device in response to the authentication request.

In Example 38, the subject matter of Example 37 can optionally include further comprising a navigation system configured to determine position information of the terminal device, wherein the transmitter is configured to transmit the authentication request including the position information of the terminal device.

In Example 39, the subject matter of any one of Examples 37 to 38 can optionally include further comprising a speed sensor configured to determine speed information of the terminal device, wherein the transmitter is configured to transmit the authentication request including the speed information of the terminal device.

In Example 40, the subject matter of any one of Examples 37 to 39 can optionally include wherein the receiver is configured to extract position information of the further terminal device from the acknowledgement received from the further terminal device, wherein the application processor is configured to determine whether or not the further terminal device is located on a road based on the position information, and wherein the terminal device is configured to discard transmission parameters included in the acknowledgement received from the further terminal device if the further device is determined to be not located on the road.

In Example 41, the subject matter of Example 40 can optionally include wherein the application processor is configured to estimate a relative position of the further terminal device in relation to the terminal device from a wireless signal including the acknowledgement received from the further wireless device, and to compare a difference between an estimated location of the further terminal device determined based on the estimated relative position and an extracted location of the further terminal device determined based on the position information extracted from the acknowledgement with a predefined threshold, wherein the terminal device is configured to discard transmission parameters included in the acknowledgement received from the further terminal device if the difference is above the predefined threshold.

In Example 42, the subject matter of Example 41 can optionally include further comprising a positioning system configured to determine an absolute position of the terminal device, wherein the application processor is configured to determine the estimated location of the further terminal device based on the estimated relative position and based on the absolute position of the terminal device.

In Example 43, the subject matter of any one of Examples 37 to 43 can optionally include wherein the receiver is configured to extract a speed of the further terminal device from the acknowledgement received from the further terminal device, and wherein the terminal device further includes an application processor configured to verify the extracted speed of the further terminal device, and wherein the terminal device is configured to discard transmission parameters included in the acknowledgement received from the further terminal device if the speed of the further terminal device is not verified.

In Example 44, the subject matter of Example 43 can optionally include wherein the application processor is configured to estimate a relative speed of the further terminal device in relation to the terminal device from a wireless signal including the acknowledgement received from the further terminal device, and to compare a difference between an estimated speed of the further terminal device determined based on the estimated relative speed of the further terminal device and the extracted speed of the further terminal device with a predefined threshold, wherein the terminal device is configured to discard transmission parameters included in the acknowledgement received from the further terminal device if the difference is above the predefined threshold.

In Example 45, the subject matter of Example 44 can optionally include further comprising a speed sensor configured to determine an absolute speed of the terminal device, wherein the application processor is configured to determine the estimated speed of the further terminal device based on the estimated relative speed and based on the absolute speed of the terminal device.

In Example 46, the subject matter of any one of Examples 37 to 45 can optionally include wherein the authentication information includes terminal identification information of the terminal device and wherein the application processor is configured to encrypt the authentication information using an asymmetric encryption algorithm.

In Example 47, the subject matter of any one of Examples 37 to 46 can optionally include wherein the application processor is configured to decrypt the acknowledgement received from the further communication device using the authentication information of the terminal device.

In Example 48, the subject matter of any one of Examples 37 to 47 can optionally include wherein the receiver is configured to extract transmission parameters from the acknowledgement received from the further terminal device for setting up peer-to-peer communications of the terminal device.

In Example 49, the subject matter of any one of Examples 37 to 48 can optionally include wherein the terminal device is configured as vehicular communication device, and wherein the transmitter is further configured to transmit geographical information relating to a travel route of the terminal device to the further terminal device.

In Example 50, the subject matter of Example 49 can optionally include wherein the geographical information is retrieved from a navigation system of the terminal device.

In Example 51, the subject matter of any one of Examples 49 to 50 can optionally include wherein the receiver is configured to receive decryption information from the further terminal device and to store the decryption information in a storage device of the terminal device.

In Example 52, the subject matter of Example 51 can optionally include wherein the decryption information includes terminal identification information of vehicular communication devices stored at the further terminal device in relation to a geographical area corresponding to the geographical information.

In Example 53, the subject matter of any one of Examples 37 to 52 can optionally include wherein the receiver is configured to receive an upgrade request from the further terminal device for requesting transmission of decryption information stored at the further terminal device to the terminal device.

In Example 54, the subject matter of Example 53 can optionally include wherein the receiver is configured to receive the upgrade request via a broadcast channel.

In Example 55, the subject matter of Example 54 can optionally include wherein the terminal device is configured as LTE V2V vehicular communication device and wherein the receiver is configured to receive the upgrade request via a Physical Side-Link Shared Channel (PSSCH).

In Example 56, the subject matter of any one of Examples 53 to 55 can optionally include wherein the transmitter is configured to transmit geographical route information indicating a travel route of the terminal device and/or capability information indicating a software and/or hardware security capability of the terminal device to store decryption information in response to the upgrade request to the further terminal device.

In Example 57, the subject matter of any one of Examples 37 to 56 can optionally include wherein the terminal identification information includes one or more of an International Mobile Subscriber Identity (IMSI), a Temporary Mobile Subscriber Identity (TMSI), a Globally Unique Temporary UE Identity (GUTI) or an International Mobile Equipment Identity (IMEI).

In Example 58, the subject matter of any one of Examples 37 to 57 can optionally include being configured as vehicular communication device.

In Example 59, the subject matter of any one of Examples 37 to 58 can optionally include wherein the terminal device is configured for LTE V2V sidelink communications with the further terminal device.

In Example 60, the subject matter of any one of Examples 37 to 59 can optionally include wherein the transmitter is configured to transmit the authentication request to the further terminal device when the terminal device is outside of coverage of a radio access network.

Example 61 is a terminal device comprising: a receiver configured to receive an authentication message from a further terminal device and to extract position information and/or a speed of the further terminal device from the authentication message; an application processor configured to determine whether or not the further terminal device is located on a road based on the position information and/or to verify the extracted speed of the further terminal device, and to discard the authentication message if the further terminal device is determined to be not the road and/or if the extracted speed is not verified.

In Example 62, the subject matter of Example 61 can optionally include wherein the application processor is configured to estimate relative position information of the further terminal device in relation to the terminal device from a wireless signal received from the further terminal device and including the authentication message, and to compare a difference between a location of the further terminal device based on the estimated relative position information and a location of the further terminal device based on the position information extracted from the authentication request with a predefined threshold, wherein the application processor is configured to discard the authentication message if the difference is above the predefined threshold.

In Example 63, the subject matter of any one of Examples 61 to 62 can optionally include wherein the application processor is configured to estimate a relative speed of the further terminal device in relation to the terminal device from a wireless signal including the authentication request received from the further terminal device, and to compare a difference between an estimated speed of the further terminal device determined based on the estimated relative speed of the further terminal device and the extracted speed of the further terminal device to a predefined threshold, and wherein the application processor is configured to discard the authentication message if the difference is above the predefined threshold.

In Example 64, the subject matter of any one of Examples 61 to 63 can optionally include wherein the authentication message is an authentication request for authenticating the further terminal device for peer-to-peer communications, the terminal device further comprising a transmitter configured to transmit an acknowledgement to the further terminal device for authenticating the further terminal device for the peer-to-peer communications if the further terminal device is determined to be on the road.

In Example 65, the subject matter of Example 64 can optionally include further comprising a storage device storing decryption information for decrypting the authentication request, wherein the application processor is configured to decrypt the authentication request based on the decryption information.

In Example 66, the subject matter of Example 65 can optionally include wherein the transmitter is configured to transmit the acknowledgement to the further terminal device if the application processor has decrypted the authentication request.

In Example 67, the subject matter of any one of Examples 64 to 66 can optionally include wherein the application processor is configured to encrypt the acknowledgement based on authentication information of the further terminal device included in the received authentication request.

In Example 68, the subject matter of Example 67 can optionally include wherein the authentication information includes terminal identification information of the further terminal device.

In Example 69, the subject matter of any one of Examples 67 to 68 can optionally include wherein the application processor is configured to encrypt the acknowledgement using a symmetric encryption algorithm.

In Example 70, the subject matter of any one of Examples 64 to 69 can optionally include wherein the application processor is configured to decrypt the authentication request using an asymmetric encryption algorithm, and wherein the decryption information for decrypting the authentication request is a private key corresponding to the further terminal device.

In Example 71, the subject matter of Example 70 can optionally include wherein the authentication request includes terminal identification information of the further terminal device encrypted by an asymmetric encryption algorithm.

In Example 72, the subject matter of any one of Examples 64 to 71 can optionally include wherein the application processor is coupled to the storage device storing decryption information via an encryption/decryption hardware configured to decrypt the decryption information.

In Example 73, the subject matter of Example 72 can optionally include wherein the encryption/decryption hardware is configured to retrieve a key for decrypting decryption information stored in the storage device from a tamper proof device and to decrypt the decryption information based on the retrieved key.

In Example 74, the subject matter of any one of Examples 72 to 73 can optionally include wherein the encryption/decryption hardware and the tamper proof device are included in a physically protected device of a vehicle.

In Example 75, the subject matter of any one of Examples 61 to 74 can optionally include wherein the terminal device does not comprise any direct link to a core network of the radio communication network and wherein the terminal device is configured for LTE V2V communications with the base station.

In Example 76, the subject matter of any one of Examples 61 to 75 can optionally include wherein the transmitter is configured to transmit the terminal identification information with an attach request message, and wherein the receiver is configured to receive the acknowledgement from the base station with an attach accept message.

In Example 77, the subject matter of any one of Examples 61 to 77 can optionally include wherein the transmitter is configured to transmit the acknowledgement to the further terminal device for authenticating the further terminal device for LTE V2V sidelink communications.

In Example 78, the subject matter of any one of Examples 61 to 77 can optionally include wherein the transmitter is configured to transmit an acknowledgement to the further terminal device when the terminal device is outside of coverage of a radio access network provided by the base station.

In Example 79, the subject matter of any one of Examples 61 to 63 can optionally include wherein the application processor is configured to encrypt authentication information of the terminal device, the terminal device further comprising a transmitter configured to transmit an authentication request including the encrypted authentication information for authenticating the terminal device for peer-to-peer communications to the further terminal device; wherein the authentication message is an acknowledgement for authenticating the terminal device for the peer-to-peer communications received from the further terminal in response to the authentication request.

In Example 80, the subject matter of Example 79 can optionally include wherein the authentication information includes terminal identification information of the terminal device and wherein the application processor is configured to encrypt the authentication information using an asymmetric encryption algorithm.

In Example 81, the subject matter of any one of Examples 79 to 80 can optionally include wherein the application processor is configured to decrypt the acknowledgement received from the further communication device using the authentication information of the terminal device.

In Example 82, the subject matter of any one of Examples 79 to 81 can optionally include wherein the receiver is configured to extract transmission parameters from the acknowledgement received from the further terminal device for setting up peer-to-peer communications of the terminal device.

In Example 83, the subject matter of any one of Examples 79 to 82 can optionally include wherein the transmitter is configured to transmit the authentication request including position information of the terminal device retrieved by a navigation system of the terminal device.

In Example 84, the subject matter of any one of Examples 61 to 83 can optionally include wherein the terminal identification information includes one or more of an International Mobile Subscriber Identity (IMSI), a Temporary Mobile Subscriber Identity (TMSI), a Globally Unique Temporary UE Identity (GUTI) or an International Mobile Equipment Identity (IMEI).

In Example 85, the subject matter of any one of Examples 61 to 84 can optionally include being configured as vehicular communication device.

In Example 86, the subject matter of any one of Examples 61 to 85 can optionally include wherein the terminal device is configured for LTE V2V sidelink communications with the further terminal device.

In Example 87, the subject matter of any one of Examples 79 to 86 can optionally include wherein the transmitter is configured to transmit the authentication request to the further terminal device when the terminal device is outside of coverage of a radio access network.

Example 88 is a terminal device comprising: a transmitter configured to transmit geographical information relating to a travel route of the terminal device to a base station of a radio communication network; a receiver configured to receive decryption information from the base station in response to the geographical information relating to a travel route of the terminal device, the decryption information including terminal identification information relating to vehicular communication devices registered at the radio communication network in relation to a geographical area corresponding to the geographical information; and a storage device for storing the decryption information.

In Example 89, the subject matter of Example 88 can optionally include wherein the receiver is configured to receive an authentication request for authenticating a further terminal device for peer-to-peer communications from the further terminal device; and wherein the transmitter is configured to transmit an acknowledgement to the further terminal device for authenticating the further terminal device for the peer-to-peer communications.

In Example 90, the subject matter of any one of Examples 88 to 89 can optionally include wherein the receiver is configured to receive geographical route information indicating a travel route of the further terminal device and/or capability information indicating a software and/or hardware security capability of the further terminal device to store decryption information.

In Example 91, the subject matter of Example 90 can optionally include wherein the transmitter is configured to transmit decryption information stored at the storage device of the terminal device to at least the further terminal device based on the geographical route information and/or the capability information.

In Example 92, the subject matter of any one of Examples 88 to 91 can optionally include wherein the terminal identification information includes one or more of an International Mobile Subscriber Identity (IMSI), a Temporary Mobile Subscriber Identity (TMSI), a Globally Unique Temporary UE Identity (GUTI) or an International Mobile Equipment Identity (IMEI).

In Example 93, the subject matter of any one of Examples 88 to 92 can optionally include wherein the geographical information is retrieved from a navigation system of the terminal device.

Example 94 is a terminal device comprising a transmitter configured to transmit geographical information relating to a travel route of the terminal device to a further terminal device; a receiver configured to receive decryption information from the further terminal device in response to the geographical information relating to a travel route of the terminal device, wherein the decryption information includes terminal identification information of vehicular communication devices stored at the further terminal device in relation to a geographical area corresponding to the geographical information; and a storage device for storing the decryption information.

In Example 95, the subject matter of Example 94 can optionally include wherein the geographical information is retrieved from a navigation system of the terminal device.

Example 96 is a communication method of a terminal device comprising: transmitting terminal identification information for identifying the terminal device to a base station of a radio communication network; receiving an acknowledgment from the base station in response to the terminal identification information, and receiving an authentication request for authenticating a further terminal device for peer-to-peer communications from the further terminal device; transmitting an acknowledgement to the further terminal device for authenticating the further terminal device for the peer-to-peer communications.

In Example 97, the subject matter of Example 96 can optionally include comprising extracting position information of the further terminal device from the authentication request, and determining whether or not the further terminal device is located on a road based on the position information, and transmitting the acknowledgement to the further terminal device if the further terminal device is determined to be located on the road.

In Example 98, the subject matter of Example 97 can optionally include comprising estimating a relative position of the further terminal device in relation to the terminal device from a wireless signal including the authentication request received from the further terminal device, and comparing a difference between an estimated location of the further terminal device determined based on the estimated relative position and an extracted location of the further terminal device determined based on the position information extracted from the authentication request with a predefined threshold, and transmitting the acknowledgement to the further terminal device if the difference is below the predefined threshold.

In Example 99, the subject matter of Example 98 can optionally include further comprising determining an absolute position of the terminal device, and determining the estimated location of the further terminal device based on the estimated relative position and based on the absolute position of the terminal device.

In Example 100, the subject matter of any one of Examples 96 to 99 can optionally include further comprising determining an absolute position of the terminal device, and transmitting the acknowledgement to the further terminal device including the absolute position of the terminal device.

In Example 101, the subject matter of any one of Examples 96 to 100 can optionally include comprising extracting a speed of the further terminal device from the authentication request, and verifying the extracted speed of the further terminal device, and transmitting the acknowledgement to the further terminal device if the extracted speed of the further terminal device is verified.

In Example 102, the subject matter of Example 101 can optionally include comprising estimating a relative speed of the further terminal device in relation to the terminal device from a wireless signal including the authentication request received from the further terminal device, and comparing a difference between an estimated speed of the further terminal device determined based on the estimated relative speed of the further terminal device and the extracted speed of the further terminal device to a predefined threshold, and transmitting the acknowledgement to the further terminal device if the difference is below the predefined threshold.

In Example 103, the subject matter of Example 102 can optionally include comprising determining an absolute speed of the terminal device, and determining the estimated speed of the further terminal device based on the estimated relative speed and based on the absolute speed of the terminal device.

In Example 104, the subject matter of any one of Examples 96 to 103 can optionally include further comprising: storing decryption information for decrypting the authentication request; and decrypting the authentication request based on the decryption information.

In Example 105, the subject matter of Example 104 can optionally include wherein the decryption information includes a plurality of decryption keys, each decryption key being associated with a corresponding further terminal device and being stored for decrypting an authentication request from the corresponding further terminal device.

In Example 106, the subject matter of Example 105 can optionally include wherein each decryption key is associated with the corresponding further terminal device and suitable for uniquely decrypting an authentication request from only the corresponding further terminal device.

In Example 107, the subject matter of any one of Examples 104 to 106 can optionally include comprising transmitting the acknowledgement to the further terminal device if the application processor has decrypted the authentication request.

In Example 108, the subject matter of any one of Examples 97 to 107 can optionally include comprising encrypting the acknowledgement based on authentication information of the further terminal device included in the received authentication request.

In Example 109, the subject matter of Example 108 can optionally include wherein the authentication information includes terminal identification information of the further terminal device.

In Example 110, the subject matter of any one of Examples 108 to 109 can optionally include comprising encrypting the acknowledgement using a symmetric encryption algorithm.

In Example 111, the subject matter of any one of Examples 97 to 110 can optionally include comprising decrypting the authentication request using an asymmetric encryption algorithm, and wherein the decryption information for decrypting the authentication request is a private key corresponding to the further terminal device.

In Example 112, the subject matter of Example 111 can optionally include wherein the authentication request includes terminal identification information of the further terminal device encrypted by an asymmetric encryption algorithm.

In Example 112, the subject matter of any one of Examples 97 to 112 can optionally include wherein the terminal device is configured as vehicular communication device, the method comprising transmitting geographical information relating to a travel route of the terminal device to the base station.

In Example 114, the subject matter of Example 113 can optionally include wherein the geographical information is retrieved from a navigation system of the terminal device.

In Example 115, the subject matter of any one of Examples 113 to 114 can optionally include comprising receiving decryption information from the base station and to store the decryption information in the storage device.

In Example 116, the subject matter of Example 115 can optionally include wherein the decryption information includes terminal identification information relating to vehicular communication devices registered at the radio communication network in relation to a geographical area corresponding to the geographical information.

In Example 117, the subject matter of any one of Examples 96 to 116 can optionally include comprising transmitting an upgrade request at least to the further terminal device for requesting transmission of decryption information stored at the storage device of the terminal device to at least the further terminal device.

In Example 118, the subject matter of Example 117 can optionally include comprising broadcasting the upgrade request.

In Example 119, the subject matter of Example 118 can optionally include wherein the terminal device is configured as LTE V2V vehicular communication device, the method comprising broadcasting the upgrade request via a Physical Side-Link Shared Channel (PSSCH).

In Example 120, the subject matter of any one of Examples 117 to 119 can optionally include comprising receiving geographical route information indicating a travel route of the further terminal device and/or capability information indicating a software and/or hardware security capability of the further terminal device to store decryption information in response to the upgrade request.

In Example 121, the subject matter of Example 120 can optionally include comprising transmitting decryption information stored at the storage device of the terminal device to at least the further terminal device based on the geographical route information and/or the capability information.

In Example 122, the subject matter of any one of Examples 96 to 121 can optionally include wherein the terminal identification information includes one or more of an International Mobile Subscriber Identity (IMSI), a Temporary Mobile Subscriber Identity (TMSI), a Globally Unique Temporary UE Identity (GUTI) or an International Mobile Equipment Identity (IMEI).

In Example 123, the subject matter of any one of Examples 96 to 122 can optionally include the terminal device being configured as vehicular communication device.

In Example 124, the subject matter of any one of Examples 95 to 123 can optionally include wherein the terminal device does not comprise any direct link to a core network of the radio communication network.

In Example 125, the subject matter of any one of Examples 96 to 124 can optionally include wherein the terminal device is configured for LTE V2V communications with the base station and for LTE V2V sidelink communications with the further terminal device.

In Example 126, the subject matter of any one of Examples 96 to 125 can optionally include comprising transmitting the terminal identification information with an attach request message, and receiving the acknowledgement from the base station with an attach accept message.

In Example 127, the subject matter of any one of Examples 96 to 126 can optionally include comprising transmitting the acknowledgement to the further terminal device for authenticating the further terminal device for LTE V2V sidelink communications.

In Example 127, the subject matter of any one of Examples 96 to 127 can optionally include comprising transmitting an acknowledgement to the further terminal device when the terminal device is outside of coverage of a radio access network provided by the base station.

Example 129 is a communication method of a terminal device comprising: encrypting authentication information of the terminal device; transmitting an authentication request including the encrypted authentication information for authenticating the terminal device for peer-to-peer communications to a further terminal device; receiving an acknowledgement for authenticating the terminal device for the peer-to-peer communications from the further terminal device in response to the authentication request.

In Example 130, the subject matter of Examples 129 can optionally include further comprising determining position information of the terminal device, and transmitting the authentication request including the position information of the terminal device.

In Example 131, the subject matter of any one of Examples 129 to 130 can optionally include further comprising a determining speed information of the terminal device, and transmitting the authentication request including the speed information of the terminal device.

In Example 132, the subject matter of any one of Examples 129 to 131 can optionally include comprising extracting position information of the further terminal device from the acknowledgement received from the further terminal device, and determining whether or not the further terminal device is located on a road based on the position information, and discarding transmission parameters included in the acknowledgement received from the further terminal device if the further device is determined to be not located on the road.

In Example 133, the subject matter of Example 132 can optionally include comprising estimating a relative position of the further terminal device in relation to the terminal device from a wireless signal including the acknowledgement received from the further terminal device, and comparing a difference between an estimated location of the further terminal device determined based on the estimated relative position and an extracted location of the further terminal device determined based on the position information extracted from the acknowledgement with a predefined threshold, and discarding transmission parameters included in the acknowledgement received from the further terminal device if the difference is above the predefined threshold.

In Example 134, the subject matter of Example 133 can optionally include further comprising determining an absolute position of the terminal device, and determining the estimated location of the further terminal device based on the estimated relative position and based on the absolute position of the terminal device.

In Example 135, the subject matter of any one of Examples 129 to 134 can optionally include comprising extracting a speed of the further terminal device from the acknowledgement received from the further terminal device, verifying the extracted speed of the further terminal device, discarding transmission parameters included in the acknowledgement received from the further terminal device if the speed of the further terminal device is not verified.

In Example 136, the subject matter of Example 135 can optionally include comprising estimating a relative speed of the further terminal device in relation to the terminal device from a wireless signal including the acknowledgement received from the further terminal device, and comparing a difference between an estimated speed of the further terminal device determined based on the estimated relative speed of the further terminal device and the extracted speed of the further terminal device with a predefined threshold, and discarding transmission parameters included in the acknowledgement received from the further terminal device if the difference is above the predefined threshold.

In Example 137, the subject matter of Example 136 can optionally include comprising determining an absolute speed of the terminal device, and determining the estimated speed of the further terminal device based on the estimated relative speed and based on the absolute speed of the terminal device.

In Example 138, the subject matter of any one of Examples 129 to 137 can optionally include wherein the authentication information includes terminal identification information of the terminal device and the method comprising encrypting the authentication information using an asymmetric encryption algorithm.

In Example 139, the subject matter of any one of Examples 129 to 138 can optionally include comprising decrypting the acknowledgement received from the further communication device using the authentication information of the terminal device.

In Example 140, the subject matter of any one of Examples 129 to 139 can optionally include comprising extracting transmission parameters from the acknowledgement received from the further terminal device for setting up peer-to-peer communications of the terminal device.

In Example 141, the subject matter of any one of Examples 129 to 140 can optionally include wherein the terminal device is configured as vehicular communication device, the method comprising transmitting geographical information relating to a travel route of the terminal device to the further terminal device.

In Example 142, the subject matter of Example 141 can optionally include wherein the geographical information is retrieved from a navigation system of the terminal device.

In Example 143, the subject matter of any one of Examples 141 to 142 can optionally include comprising receiving decryption information from the further terminal device and to store the decryption information in a storage device of the terminal device.

In Example 144, the subject matter of Example 143 can optionally include wherein the decryption information includes terminal identification information of vehicular communication devices stored at the further terminal device in relation to a geographical area corresponding to the geographical information.

In Example 145, the subject matter of any one of Examples 129 to 144 can optionally include comprising receiving an upgrade request from the further terminal device for requesting transmission of decryption information stored at the further terminal device to the terminal device.

In Example 146, the subject matter of Example 145 can optionally include comprising receiving the upgrade request via a broadcast channel.

In Example 147, the subject matter of Example 146 can optionally include wherein the terminal device is configured as LTE V2V vehicular communication device, the method comprising receiving the upgrade request via a Physical Side-Link Shared Channel (PSSCH).

In Example 148, the subject matter of any one of Examples 145 to 148 can optionally include comprising transmitting geographical route information indicating a travel route of the terminal device and/or capability information indicating a software and/or hardware security capability of the terminal device to store decryption information in response to the upgrade request to the further terminal device.

In Example 149, the subject matter of any one of Examples 129 to 148 can optionally include wherein the terminal identification information includes one or more of an International Mobile Subscriber Identity (IMSI), a Temporary Mobile Subscriber Identity (TMSI), a Globally Unique Temporary UE Identity (GUTI) or an International Mobile Equipment Identity (IMEI).

In Example 150, the subject matter of any one of Examples 129 to 149 can optionally include the terminal device being configured as vehicular communication device.

In Example 151, the subject matter of any one of Examples 129 to 150 can optionally include wherein the terminal device is configured for LTE V2V sidelink communications with the further terminal device.

In Example 152, the subject matter of any one of Examples 129 to 151 can optionally include comprising transmitting the authentication request to the further terminal device when the terminal device is outside of coverage of a radio access network.

Example 153 is a communication method of a terminal device comprising: receiving an authentication message from a further terminal device and to extract position information and/or a speed of the further terminal device from the authentication message; determining whether or not the further terminal device is located on a road based on the position information and/or to verify the extracted speed of the further terminal device, and to discard the authentication message if the further terminal device is determined to be not the road and/or if the extracted speed is not verified.

In Example 154, the subject matter of Example 153 can optionally include comprising estimating relative position information of the further terminal device in relation to the terminal device from a wireless signal received from the further terminal device and including the authentication message, and comparing a difference between a location of the further terminal device based on the estimated relative position information and a location of the further terminal device based on the position information extracted from the authentication request with a predefined threshold, and discarding the authentication message if the difference is above the predefined threshold.

In Example 155, the subject matter of any one of Examples 153 to 154 can optionally include comprising estimating a relative speed of the further terminal device in relation to the terminal device from a wireless signal including the authentication request received from the further terminal device, and comparing a difference between an estimated speed of the further terminal device determined based on the estimated relative speed of the further terminal device and the extracted speed of the further terminal device to a predefined threshold, and discarding the authentication message if the difference is above the predefined threshold.

In Example 156, the subject matter of any one of Examples 153 to 155 can optionally include wherein the authentication message is an authentication request for authenticating the further terminal device for peer-to-peer communications, the method further comprising transmitting an acknowledgement to the further terminal device for authenticating the further terminal device for the peer-to-peer communications if the further terminal device is determined to be on the road.

In Example 157, the subject matter of Example 156 can optionally include further comprising storing decryption information for decrypting the authentication request, and decrypting the authentication request based on the decryption information.

In Example 158, the subject matter of Example 157 can optionally include comprising transmitting the acknowledgement to the further terminal device if the application processor has decrypted the authentication request.

In Example 159, the subject matter of any one of Examples 156 to 158 can optionally include comprising encrypting the acknowledgement based on authentication information of the further terminal device included in the received authentication request.

In Example 160, the subject matter of Example 159 can optionally include wherein the authentication information includes terminal identification information of the further terminal device.

In Example 161, the subject matter of any one of Examples 159 to 160 can optionally include comprising encrypting the acknowledgement using a symmetric encryption algorithm.

In Example 162, the subject matter of any one of Examples 156 to 161 can optionally include comprising decrypting the authentication request using an asymmetric encryption algorithm, and wherein the decryption information for decrypting the authentication request is a private key corresponding to the further terminal device.

In Example 163, the subject matter of Example 162 can optionally include wherein the authentication request includes terminal identification information of the further terminal device encrypted by an asymmetric encryption algorithm.

In Example 164, the subject matter of any one of Examples 153 to 164 can optionally include wherein the terminal device does not comprise any direct link to a core network of the radio communication network and wherein the terminal device is configured for LTE V2V communications with the base station.

In Example 165, the subject matter of any one of Examples 153 to 165 can optionally include comprising transmitting the terminal identification information with an attach request message, and receiving the acknowledgement from the base station with an attach accept message.

In Example 166, the subject matter of any one of Examples 153 to 165 can optionally include comprising transmitting the acknowledgement to the further terminal device for authenticating the further terminal device for LTE V2V sidelink communications.

In Example 167, the subject matter of any one of Examples 153 to 166 can optionally include comprising transmitting an acknowledgement to the further terminal device when the terminal device is outside of coverage of a radio access network provided by the base station.

In Example 168, the subject matter of any one of Examples 153 to 167 can optionally include comprising encrypting authentication information of the terminal device, the method further comprising transmitting an authentication request including the encrypted authentication information for authenticating the terminal device for peer-to-peer communications to the further terminal device; wherein the authentication message is an acknowledgement for authenticating the terminal device for the peer-to-peer communications received from the further terminal in response to the authentication request.

In Example 169, the subject matter of Example 168 can optionally include wherein the authentication information includes terminal identification information of the terminal device the method comprising encrypting the authentication information using an asymmetric encryption algorithm.

In Example 170, the subject matter of any one of Examples 168 to 169 can optionally include comprising decrypting the acknowledgement received from the further communication device using the authentication information of the terminal device.

In Example 171, the subject matter of any one of Examples 168 to 170 can optionally include comprising extracting transmission parameters from the acknowledgement received from the further terminal device for setting up peer-to-peer communications of the terminal device.

In Example 172, the subject matter of any one of Examples 168 to 171 can optionally include comprising transmitting the authentication request including position information of the terminal device retrieved by a navigation system of the terminal device.

In Example 173, the subject matter of any one of Examples 153 to 172 can optionally include wherein the terminal identification information includes one or more of an International Mobile Subscriber Identity (IMSI), a Temporary Mobile Subscriber Identity (TMSI), a Globally Unique Temporary UE Identity (GUTI) or an International Mobile Equipment Identity (IMEI).

In Example 174, the subject matter of any one of Examples 153 to 173 can optionally include the terminal device being configured as vehicular communication device.

In Example 175, the subject matter of any one of Examples 153 to 174 can optionally include wherein the terminal device is configured for LTE V2V sidelink communications with the further terminal device.

In Example 176, the subject matter of any one of Examples 168 to 175 can optionally include comprising transmitting the authentication request to the further terminal device when the terminal device is outside of coverage of a radio access network.

Example 177 is a communication method of a terminal device comprising: transmitting geographical information relating to a travel route of the terminal device to a base station of a radio communication network; receiving decryption information from the base station in response to the geographical information relating to a travel route of the terminal device, the decryption information including terminal identification information relating to vehicular communication devices registered at the radio communication network in relation to a geographical area corresponding to the geographical information; and storing the decryption information.

In Example 178, the subject matter of Example 177 can optionally include comprising receiving an authentication request for authenticating a further terminal device for peer-to-peer communications from the further terminal device; and transmitting an acknowledgement to the further terminal device for authenticating the further terminal device for the peer-to-peer communications.

In Example 179, the subject matter of any one of Examples 177 to 178 can optionally include comprising receiving geographical route information indicating a travel route of the further terminal device and/or capability information indicating a software and/or hardware security capability of the further terminal device to store decryption information.

In Example 180, the subject matter of Example 179 can optionally include comprising transmitting decryption information stored at the storage device of the terminal device to at least the further terminal device based on the geographical route information and/or the capability information.

In Example 181, the subject matter of any one of Examples 177 to 180 can optionally include wherein the terminal identification information includes one or more of an International Mobile Subscriber Identity (IMSI), a Temporary Mobile Subscriber Identity (TMSI), a Globally Unique Temporary UE Identity (GUTI) or an International Mobile Equipment Identity (IMEI).

In Example 182, the subject matter of any one of Examples 177 to 181 can optionally include wherein the geographical information is retrieved from a navigation system of the terminal device.

Example 183 is a communication method of a terminal device comprising: transmitting geographical information relating to a travel route of the terminal device to a further terminal device; receiving decryption information from the further terminal device in response to the geographical information relating to a travel route of the terminal device, wherein the decryption information includes terminal identification information of vehicular communication devices stored at the further terminal device in relation to a geographical area corresponding to the geographical information; and storing the decryption information.

In Example 184, the subject matter of Example 183 can optionally include wherein the geographical information is retrieved from a navigation system of the terminal device.

Example 185 is a non-transitory computer readable medium storing instructions that, when executed by one or more processors of a terminal device, cause the terminal device to perform the method of any one of examples 96 to 128.

Example 186 is a terminal device comprising: one or more processors; and a memory storing instructions that, when executed by the one or more processors, cause the terminal device to perform the method of any one of examples 96 to 128.

Example 187 is a non-transitory computer readable medium storing instructions that, when executed by one or more processors of a terminal device, cause the terminal device to perform the method of any one of examples 129 to 152.

Example 188 is a terminal device comprising: one or more processors; and a memory storing instructions that, when executed by the one or more processors, cause the terminal device to perform the method of any one of examples 129 to 152.

Example 189 is a non-transitory computer readable medium storing instructions that, when executed by one or more processors of a terminal device, cause the terminal device to perform the method of any one of examples 153 to 176.

Example 190 is a terminal device comprising: one or more processors; and a memory storing instructions that, when executed by the one or more processors, cause the terminal device to perform the method of any one of examples 153 to 176.

Example 191 is a non-transitory computer readable medium storing instructions that, when executed by one or more processors of a terminal device, cause the terminal device to perform the method of any one of examples 177 to 182.

Example 192 is a terminal device comprising: one or more processors; and a memory storing instructions that, when executed by the one or more processors, cause the terminal device to perform the method of any one of examples 177 to 182.

Example 193 is a non-transitory computer readable medium storing instructions that, when executed by one or more processors of a terminal device, cause the terminal device to perform the method of any one of examples 183 to 184.

Example 194 is a terminal device comprising: one or more processors; and a memory storing instructions that, when executed by the one or more processors, cause the terminal device to perform the method of any one of examples 183 to 184.

While the above descriptions used various 5G NR numerologies as exemplary use cases, the use of these specific examples serve to enhance the clarity of the description and do not limit the applicability or scope of the techniques described herein. While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A terminal device configured as a vehicular communication device, the terminal device comprising:
a transmitter configured to:
transmit terminal identification information for identifying the terminal device to a base station of a radio communication network; and
transmit geographical information relating to a travel route of the terminal device to the base station; and
a receiver configured to:
receive an acknowledgment from the base station in response to the terminal identification information,
receive an authentication request for authenticating a further terminal device for peer-to-peer communications from the further terminal device, and
extract position information of the further terminal device from the authentication request;
the transmitter being configured to transmit an acknowledgement to the further terminal device for authenticating the further terminal device for the peer-to-peer communications based on the position information.

2. The terminal device according to claim 1, wherein the terminal device further comprises an application processor configured to determine whether the further terminal device is located on a road based on the position information, and wherein the transmitter is configured to transmit the acknowledgement to the further terminal device if the further terminal device is determined to be located on the road.

3. The terminal device according to claim 1, wherein the receiver is configured to extract a speed of the further terminal device from the authentication request, and wherein the terminal device further comprises an application processor configured to verify the extracted speed of the further terminal device, and wherein the transmitter is configured to transmit the acknowledgement to the further terminal device if the application processor verifies the extracted speed of the further terminal device.

4. The terminal device according to claim 1, further comprising:
a storage device storing decryption information for decrypting the authentication request; and an application processor configured to decrypt the authentication request based on the decryption information.

5. The terminal device according to claim 4, wherein the decryption information includes a plurality of decryption keys, each decryption key being associated with a corresponding further terminal device and being stored for decrypting an authentication request from the corresponding further terminal device.

6. The terminal device according to claim 5, wherein each decryption key is associated with the corresponding further terminal device and suitable for uniquely decrypting an authentication request from only the corresponding further terminal device.

7. The terminal device according to claim 2, wherein the application processor is configured to encrypt the acknowledgement based on authentication information of the further terminal device included in the received authentication request.

8. The terminal device according to claim 7, wherein the authentication information includes terminal identification information of the further terminal device.

9. The terminal device according to claim 4, wherein the application processor is coupled to the storage device storing decryption information via an encryption/decryption hardware configured to decrypt the decryption information.

10. The terminal device according to claim 1, wherein the receiver is configured to receive decryption information from the base station and to store the decryption information in the storage device.

11. The terminal device according to claim 1, wherein the terminal identification information includes one or more of an International Mobile Subscriber Identity (IMSI), a Temporary Mobile Subscriber Identity (TMSI), a Globally Unique Temporary UE Identity (GUTI) or an International Mobile Equipment Identity (IMEI).

12. A terminal device configured as a vehicular communication device, the terminal device comprising:
an application processor configured to encrypt authentication information of the terminal device;
a transmitter configured to:
transmit an authentication request including the encrypted authentication information for authenticating the terminal device for peer-to-peer communications to a further terminal device; and
transmit geographical information relating to a travel route of the terminal device to the base station; and
a receiver configured to:
receive an acknowledgement for authenticating the terminal device for the peer-to-peer communications from the further terminal device in response to the authentication request, and
extract position information of the further terminal device from the acknowledgement received from the further terminal device,
the terminal device is configured to discard transmission parameters included in the acknowledgement received from the further terminal device based on the position information.

13. The terminal device according to claim 12, wherein the application processor is configured to determine whether the further terminal device is located on a road based on the position information, and wherein the terminal device is configured to discard transmission parameters included in the acknowledgement received from the further terminal device if the further device is determined to be not located on the road.

14. The terminal device according to claim 13, wherein the application processor is configured to estimate a relative position of the further terminal device in relation to the terminal device from a wireless signal including the acknowledgement received from the further wireless device, and to compare a difference between an estimated location of the further terminal device determined based on the estimated relative position and an extracted location of the further terminal device determined based on the position information extracted from the acknowledgement with a predefined threshold, wherein the terminal device is configured to discard transmission parameters included in the acknowledgement received from the further terminal device if the difference is above the predefined threshold.

15. The terminal device according to claim 12, wherein the receiver is configured to extract a speed of the further terminal device from the acknowledgement received from the further terminal device, and wherein the terminal device further includes an application processor configured to verify the extracted speed of the further terminal device, and wherein the terminal device is configured to discard transmission parameters included in the acknowledgement received from the further terminal device if the speed of the further terminal device is not verified.

16. The terminal device according to claim 15, wherein the application processor is configured to estimate a relative speed of the further terminal device in relation to the terminal device from a wireless signal including the acknowledgement received from the further terminal device, and to compare a difference between an estimated speed of the further terminal device determined based on the estimated relative speed of the further terminal device and the extracted speed of the further terminal device with a predefined threshold, wherein the terminal device is configured to discard transmission parameters included in the acknowledgement received from the further terminal device if the difference is above the predefined threshold.

17. A terminal device comprising:
a receiver configured to receive an authentication message from a further terminal device and to extract position information and/or speed of the further terminal device from the authentication message;
an application processor configured to determine whether the further terminal device is located on a road based on the position information and/or to verify the extracted speed of the further terminal device, and discard the authentication message if the further terminal device is determined to be not on the road and/or if the extracted speed is not verified.

18. The terminal device according to claim 17, wherein the authentication message is an authentication request for authenticating the further terminal device for peer-to-peer communications, the terminal device further comprising a transmitter configured to transmit an acknowledgement to the further terminal device for authenticating the further terminal device for the peer-to-peer communications if the further terminal device is determined to be on the road.

19. A terminal device configured as a vehicular communication device, the terminal device comprising:
a transmitter configured to transmit geographical information relating to a travel route of the terminal device to a further terminal device;
a receiver configured to:
receive decryption information from the further terminal device in response to the geographical information relating to a travel route of the terminal device, wherein the decryption information includes terminal identification information of vehicular communication devices stored at the further terminal device in relation to a geographical area corresponding to the geographical information,
extract position information of the further terminal device from the acknowledgement received from the further terminal device; and
a storage device for storing the decryption information, wherein the receiver is configured to store the decryption information in the storage device based on the position information.

\* \* \* \* \*